United States Patent

Goto

(10) Patent No.: US 11,899,191 B2
(45) Date of Patent: Feb. 13, 2024

(54) ZOOM LENS AND IMAGE PICKUP APPARATUS

(71) Applicant: CANON KABUSHIKI KAISHA, Tokyo (JP)

(72) Inventor: Kazufumi Goto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 17/588,432

(22) Filed: Jan. 31, 2022

(65) Prior Publication Data

US 2022/0244513 A1 Aug. 4, 2022

(30) Foreign Application Priority Data

Feb. 3, 2021 (JP) ................................ 2021-015921

(51) Int. Cl.
*G02B 15/14* (2006.01)
*G02B 13/00* (2006.01)

(52) U.S. Cl.
CPC ... *G02B 15/145125* (2019.08); *G02B 13/009* (2013.01)

(58) Field of Classification Search
CPC .... G02B 15/145125; G02B 15/144113; G02B 15/145117; G02B 15/24; G02B 15/144109; G02B 15/1441; G02B 15/1451; G02B 15/1461
See application file for complete search history.

(56) References Cited

U.S. PATENT DOCUMENTS

| 2003/0156335 | A1 | 8/2003 | Takatsuki |
| 2012/0019930 | A1 | 1/2012 | Yamanashi |
| 2013/0070114 | A1* | 3/2013 | Imaoka ........... G02B 15/145523 359/680 |
| 2017/0075094 | A1 | 3/2017 | Imai et al. |

FOREIGN PATENT DOCUMENTS

| JP | 2004-309761 A | 11/2004 |
| JP | 2016-009122 * | 1/2016 ............ G02B 15/14 |
| JP | 2016009122 A | 1/2016 |

OTHER PUBLICATIONS

Extended European Search Report dated May 24, 2022 in corresponding EP Patent Application No. 22154273.1.

* cited by examiner

*Primary Examiner* — Joseph P Martinez
(74) *Attorney, Agent, or Firm* — Carter, DeLuca & Farrell LLP

(57) ABSTRACT

A zoom lens includes, in order from an object side to an image side, a first lens unit having a positive refractive power, a plurality of zooming lens units configured to move along an optical axis in zooming and including a lens unit having a negative refractive power, and a final lens unit having a positive refractive power. A distance between each pair of adjacent lens units changes in zooming. The first lens unit includes, in order from the object side to the image side, a first subunit having a negative refractive power, a second subunit having a negative refractive power, and at least one subsequent subunit, a distance between each pair of adjacent subunits changing for focusing. The second subunit is configured to move along the optical axis for focusing. A predetermined condition is satisfied.

15 Claims, 20 Drawing Sheets

ZOOM LENS AND IMAGE PICKUP APPARATUS

BACKGROUND OF THE INVENTION

Field of the Invention

The present invention relates to a zoom lens and an image pickup apparatus.

Description of the Related Art

Since imaging devices such as CCD and CMOS used for TV cameras and movie cameras have a high resolving power over the entire imaging range, zoom lenses used for these cameras are demanded to have a high resolving power from the center to the periphery of the image. Moreover, the zoom lens is demanded to have a shallow depth of field, and a large aperture diameter in order to reduce the number of lighting devices.

Japanese Patent Laid-Open No. ("JP") 2004-309761 discloses a positive lead type zoom lens having a ⅔ type format for a broadcast, a zoom ratio of about 3 times, and an F-number of about 1.5. The zoom lens disclosed in JP 2004-309761 includes, in order from an object side, first to fourth lens units having positive, negative, positive or negative, and positive refractive powers, and a diagram disposed on the object side of the fourth lens unit. In the zoom lens disclosed in JP 2004-309761, the first lens unit is fixed relative to an image plane during zooming. In the zoom lens disclosed in JP 2004-309761, the first lens unit includes, in order from the object side, first to third subunits having negative, negative, and positive refractive powers and has an inner focus type configuration in which the second subunit is responsible for focusing.

A lens diameter of a lens unit closest to the object in the first lens unit is determined by an off-axis ray at the wide-angle end, and a lens diameter of a lens unit closest to the image plane in the first lens unit is determined by an on-axis ray at the telephoto end. Therefore, in order to increase the aperture diameter, as the first lens unit becomes thicker, the zoom lens becomes larger. In the zoom lens disclosed in JP 2004-309761, the first lens unit is thick, and thus the zoom lens becomes large when dealing with a large sensors such as a Super 35 format and a full frame format while maintaining the F-number.

SUMMARY OF THE DISCLOSURE

An aspect of the disclosure provides, for example, a zoom lens beneficial in a large aperture, a small size and a light weight, and a high optical performance over an entire zoom range thereof.

A zoom lens according to one aspect of the present invention includes, in order from an object side to an image side, a first lens unit having a positive refractive power, a plurality of zooming lens units configured to move along an optical axis in zooming and including a lens unit having a negative refractive power, and a final lens unit having a positive refractive power. A distance between each pair of adjacent lens units changes in zooming. The first lens unit includes, in order from the object side to the image side, a first subunit having a negative refractive power, a second subunit having a negative refractive power, and at least one subsequent subunit, a distance between each pair of adjacent subunits changing for focusing. The second subunit is configured to move along the optical axis for focusing. The following inequality is satisfied:

$$0.20 < f1R/f1 < 1.10$$

where $f1R$ is a focal length of the at least one subsequent subunit in an in-focus state at infinity, and $f1$ is a focal length of the first lens unit in the in-focus state at infinity.

Further features of the present invention will become apparent from the following description of exemplary embodiments with reference to the attached drawings.

DESCRIPTION OF THE EMBODIMENTS

Figure 1:
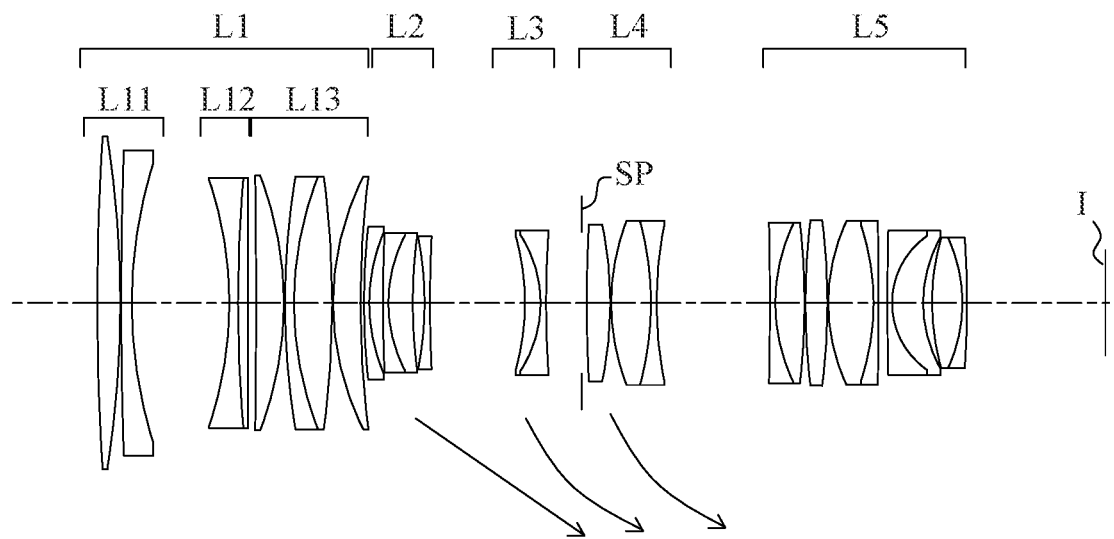
FIG. 1 is a sectional view of a zoom lens according to Example 1 at a wide-angle end in an in-focus state at infinity (on an infinity object).
Figure 2A:
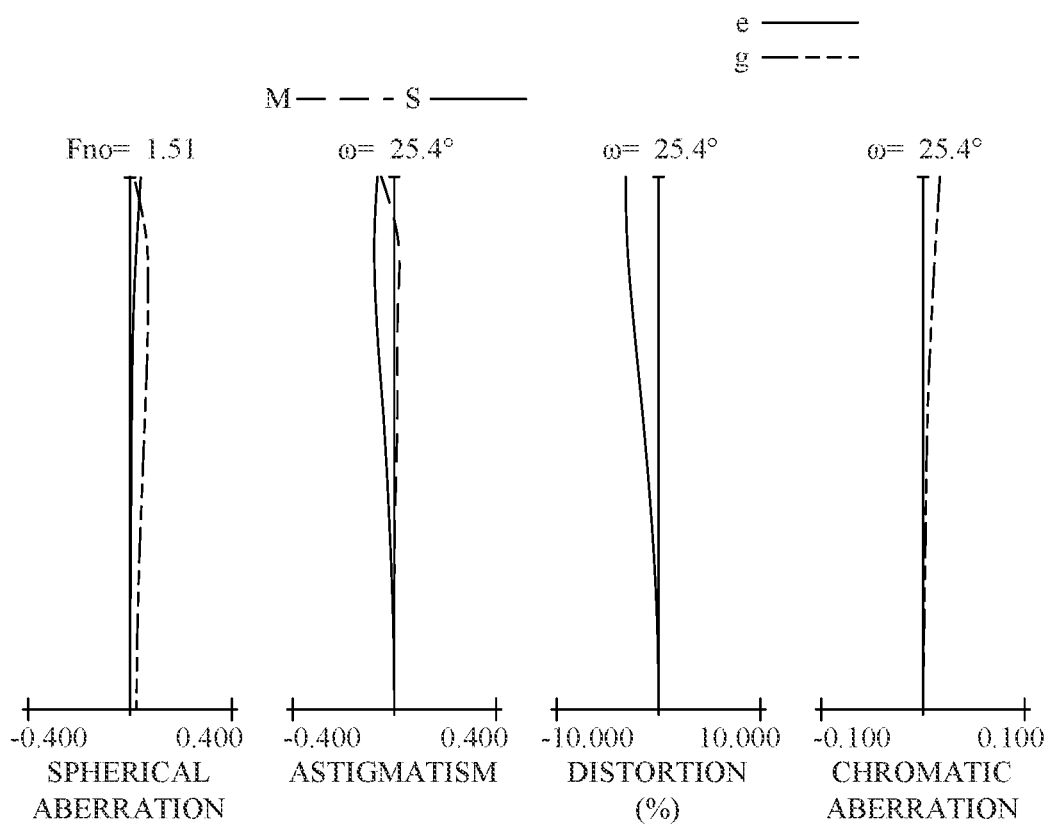
FIGS. 2A, 2B, and 2C are longitudinal aberration diagrams of the zoom lens according to Example 1 at the wide-angle end, at a focal length of 70 mm, and at a telephoto end, in the in-focus state at infinity, respectively.
Figure 2B:
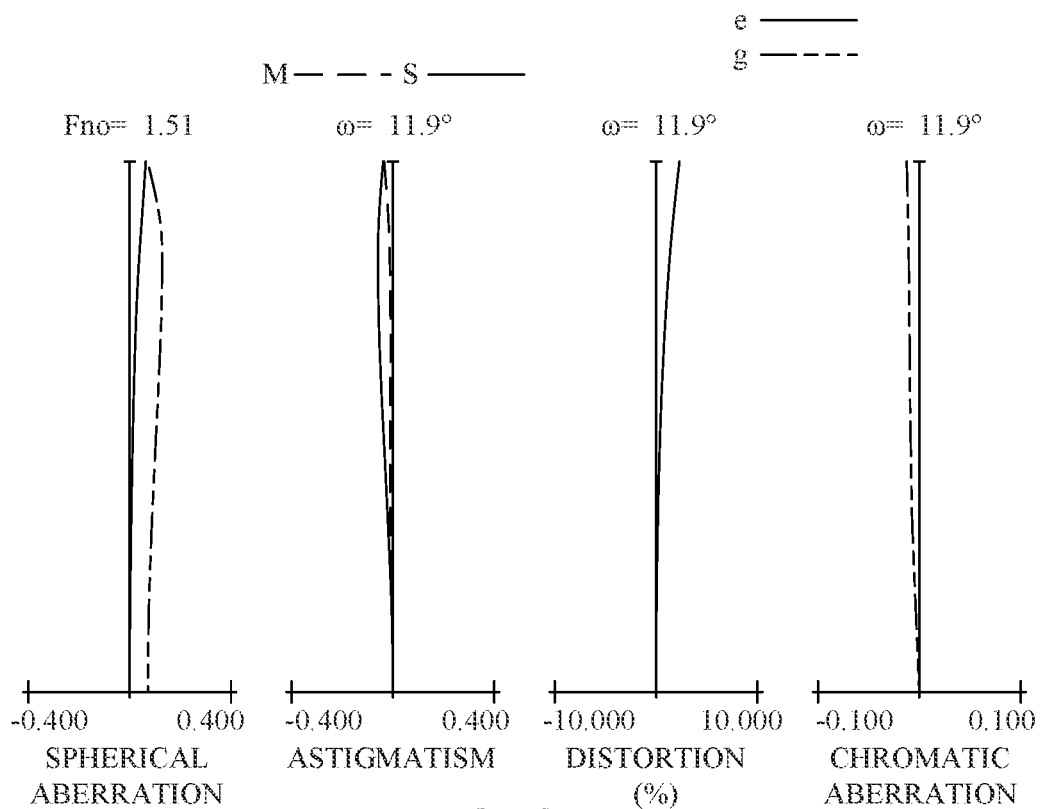
Figure 2C:
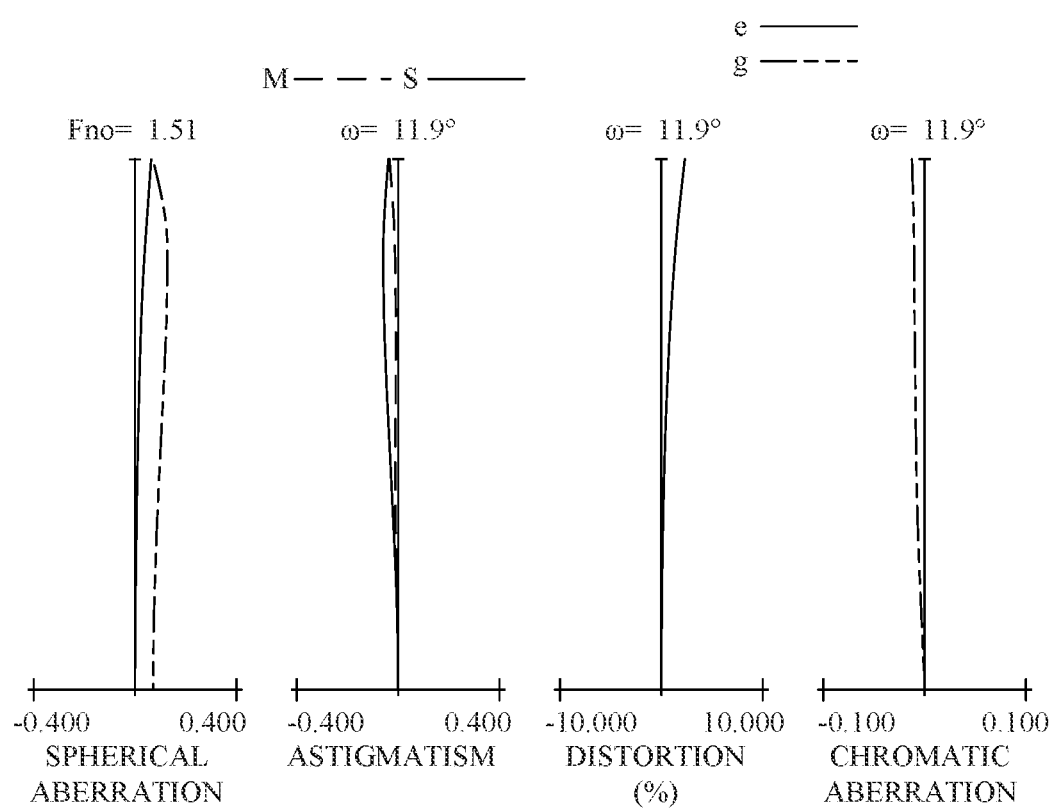

Referring now to the accompanying drawings, a detailed description will be given of embodiments according to the present invention. Corresponding elements in respective figures will be designated by the same reference numerals, and a duplicate description thereof will be omitted.

FIGS. 1, 4, 6, 8, 10, 12, 14, 16, and 18 are sectional views of zoom lenses of Examples 1 to 9 at a wide-angle end in an in-focus state at infinity (on an infinity object) (or an infinity in-focus state), respectively. The zoom lens according to each example is used for an image pickup apparatus such as a digital video camera, a digital still camera, a broadcasting camera, a film-based camera, and a surveillance camera.

In each sectional view, a left side is an object side, and a right side is an image side. The zoom lens according to each example includes a plurality of lens units. In this specification, a lens unit is a group of lenses that move or stand still during zooming (magnification variation). That is, in the zoom lens according to each example, each distance between adjacent lens units is changed during zooming. An arrow illustrated in each sectional view indicates a moving direction of the lens unit during zooming from the wide-angle end to a telephoto end. The lens unit may include one more lenses. The lens unit may include a diaphragm (aperture stop). The wide-angle end and the telephoto end refer to zoom positions when the second lens unit L2, which will be described later, is located at both ends of a movable range in zooming.

In each sectional view, Li denotes an i-th (i is a natural number) lens unit counted from the object side among lens units included in the zoom lens.

SP denotes the diaphragm (aperture stop). I denotes an image plane, and when the zoom lens according to each example is used as an imaging optical system for a digital still camera or a digital video camera, an imaging surface of a solid-state image sensor (an image pickup element or a photoelectric conversion element) such as a CCD sensor or a CMOS sensor is placed there. When the zoom lens according to each example is used as a imaging optical system for a film-based camera, a photosensitive plane corresponding to a film plane is placed on the image plane I.

FIGS. 2A, 5A, 7A, 9A, 11A, 13A, 15A, 17A, and 19A are longitudinal aberration diagrams of the zoom lenses according to Examples 1 to 9 at the wide-angle end, respectively. FIGS. 2B, 5B, 7B, 9B, 11B, 13B, 15B, 17B, and 19B are longitudinal aberration diagrams of the zoom lenses according to Examples 1 to 9 at focal lengths of 70, 65, 38, 85, 70, 104, 80, 170, and 73 mm, respectively. FIGS. 2C, 5C, 7C, 9C, 11C, 13C, 15C, 17C, and 19C are longitudinal aberration diagrams of the zoom lenses according to Examples 1 to 9 at the telephoto end, respectively. Each aberration diagram illustrates a longitudinal aberration diagram in the in-focus state at infinity. The spherical aberration is illustrated in a range of ±0.400 mm, the astigmatism is illustrated in a range of ±0.400 mm, the distortion is illustrated in a range of ±10.000%, and the lateral chromatic aberration is illustrated in a range of ±0.100 mm.

In the spherical aberration diagram, Fno denotes an F-number and indicates spherical aberration amounts for the e-line (wavelength 546.1 nm) and the g-line (wavelength 435.8 nm). In the astigmatism diagram, M denotes an astigmatism amount on a meridional image plane, and S denotes an astigmatism amount on a sagittal image plane. The distortion diagram illustrates a distortion amount for the e-line. The chromatic aberration diagram illustrates a chromatic amount for the g-line. ω is an half imaging angle of view (°).

Next follows a description of a characteristic configuration of the zoom lens according to each example.

The present invention can provide a small and lightweight zoom lens having an F-number of about 1.4 to 3, a zoom ratio of about 2 to 4 times, and a high optical performance over the entire zoom range.

The zoom lens according to each example includes, in order from the object side to the image side, a first lens unit L1 having a positive refractive power; a plurality of zooming lens units having a negative refractive power configured to move along the optical axis during zooming and including a negative refractive power; and a final lens unit having a positive refractive power. In the zoom lens according to each example, each distance between adjacent lens units is changed during zooming.

In each example, the first lens unit L1 is fixed during (or is not moved for) zooming, but at least one subunit included in the first lens unit L1 may be moved.

The first lens unit L1 includes, in order from the object side to the image side, a first subunit L11 having a negative refractive power, a second subunit L12 having a negative refractive power, and a subsequent subunit (also referred to as "at least one subsequent subunit") L1R. The second subunit L12 is moved along the optical axis during focusing.

The zoom lens according to each example satisfies the following inequality (conditional expression) (1).

$$0.20 < f1R/f1 < 1.10 \quad (1)$$

where f1R is a focal length of the subsequent subunit (at least one subsequent subunit) L1R in the in-focus state at infinity, and f1 is a focal length of the first lens unit L1 in the in-focus state at infinity.

Figure 3A:
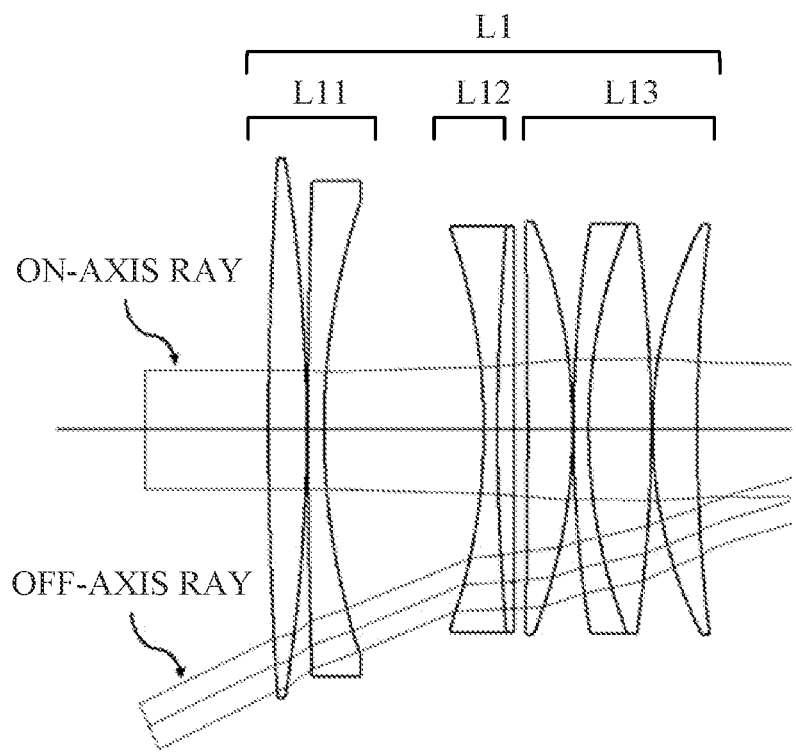
FIGS. 3A and 3B are optical path diagrams of light rays passing through a first lens unit in the zoom lens according to Example 1 at the wide-angle end and at the telephoto end, in the in-focus state at infinity, respectively.
Figure 3B:
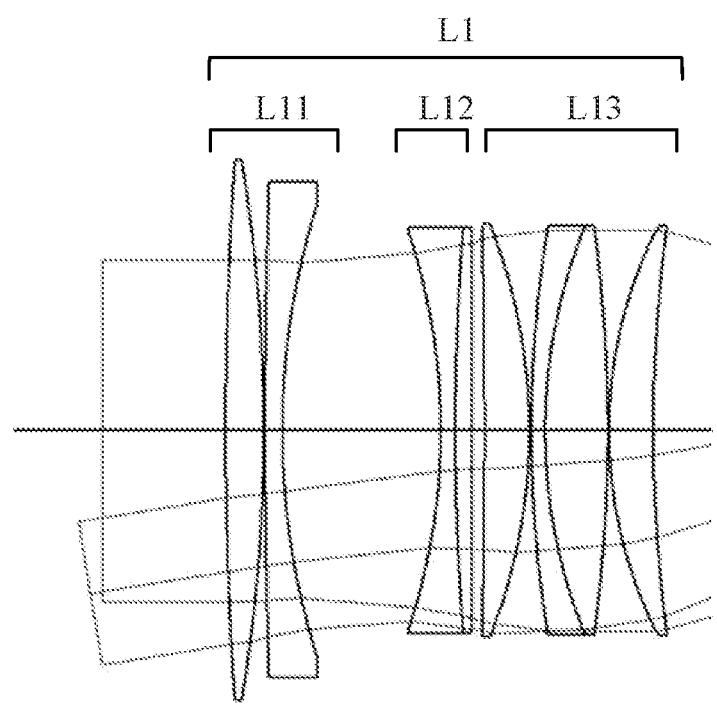
Figure 4:
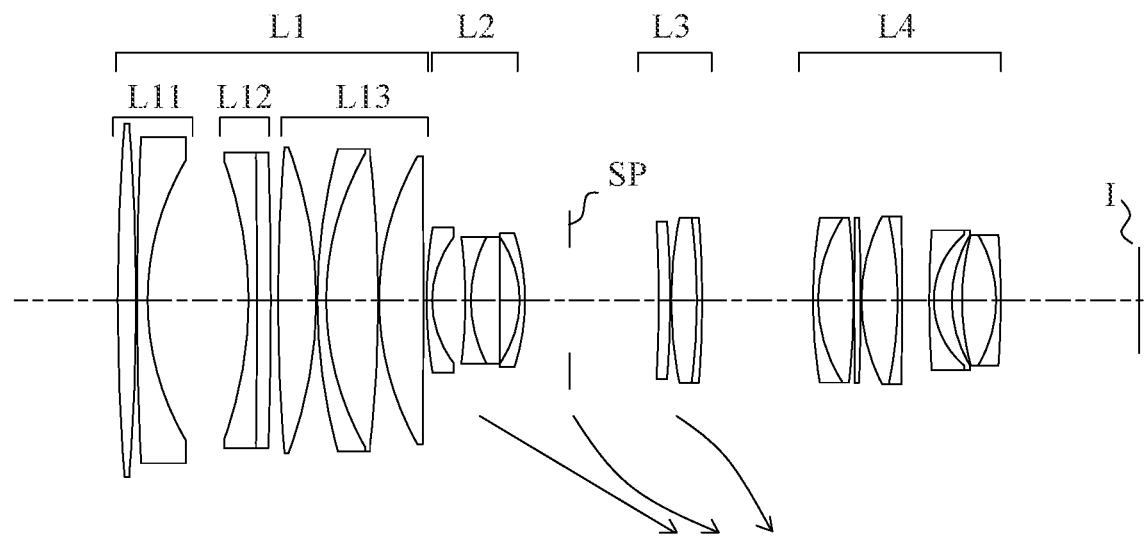
FIG. 4 is a sectional view of a zoom lens according to Example 2 at a wide-angle end in an in-focus state at infinity.
Figure 5A:
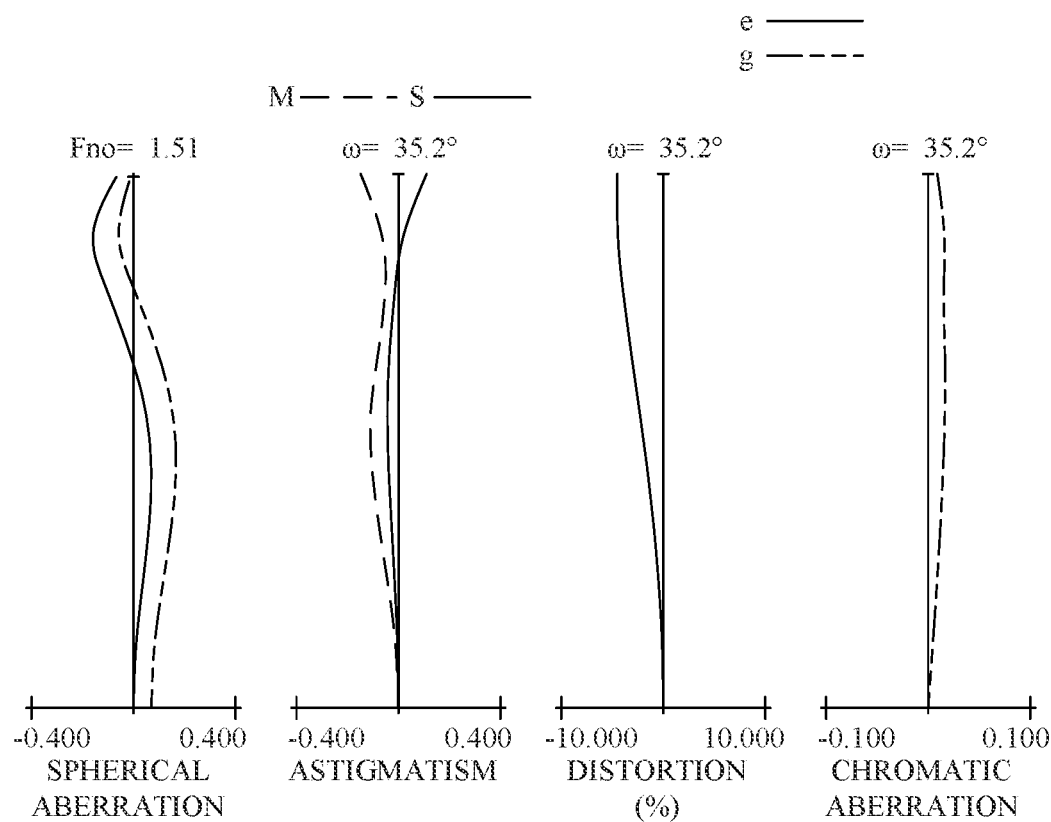
FIGS. 5A, 5B, and 5C are longitudinal aberration diagrams of the zoom lens according to Example 2 at the wide-angle end, at a focal length of 65 mm, and at a telephoto end in Example 1, in an in-focus state at infinity, respectively.
Figure 5B:
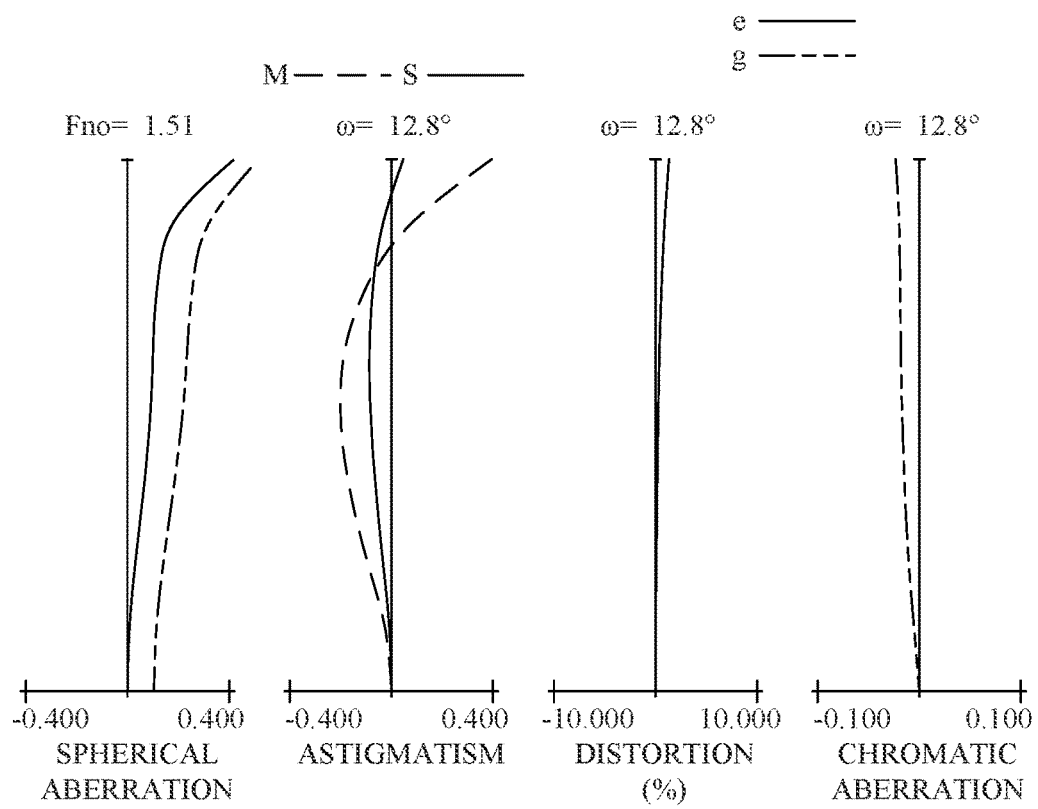
Figure 5C:
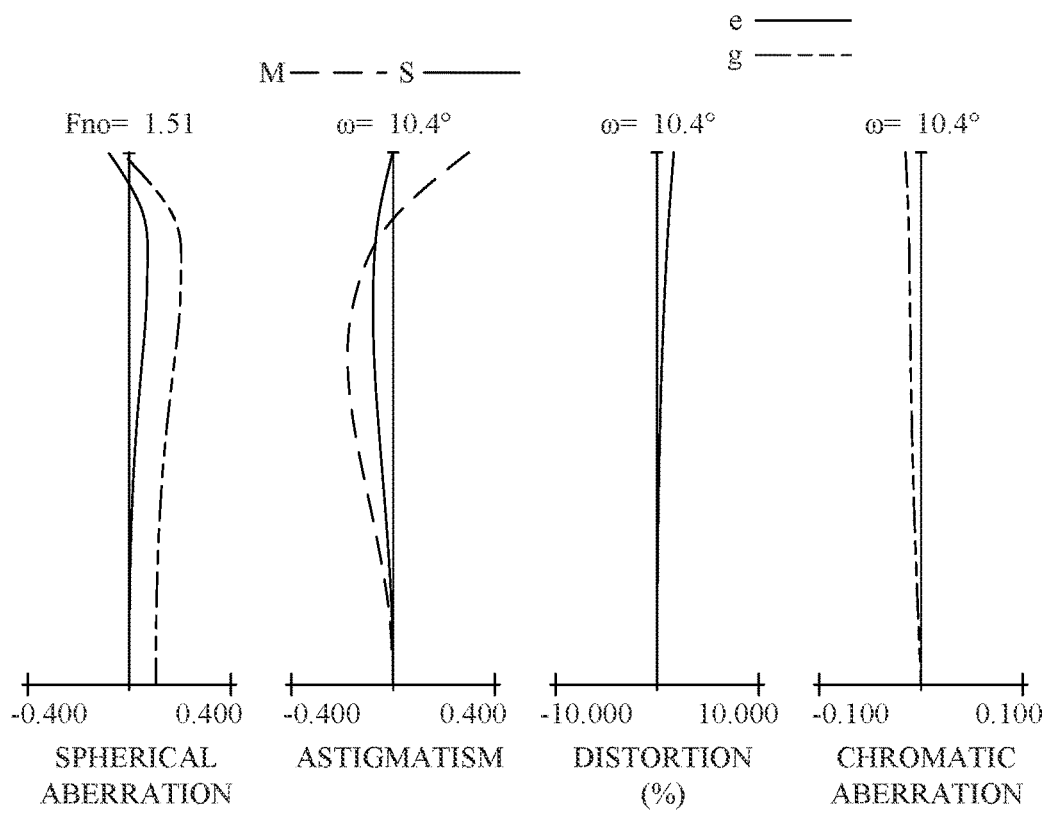
Figure 6:
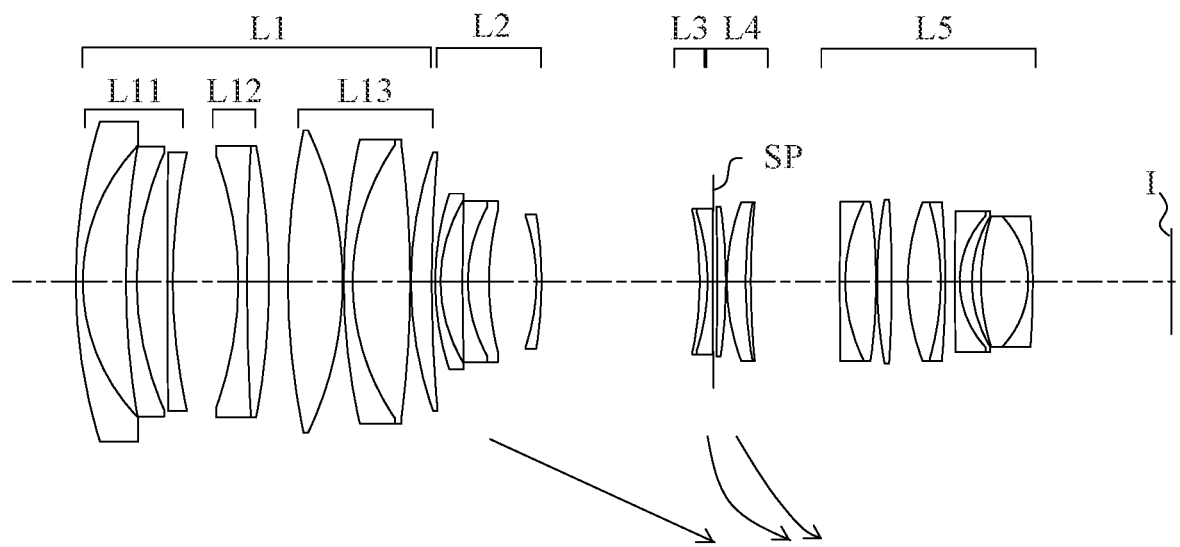
FIG. 6 is a sectional view of a zoom lens according to Example 3 at a wide-angle end in an in-focus state at infinity.
Figure 7A:
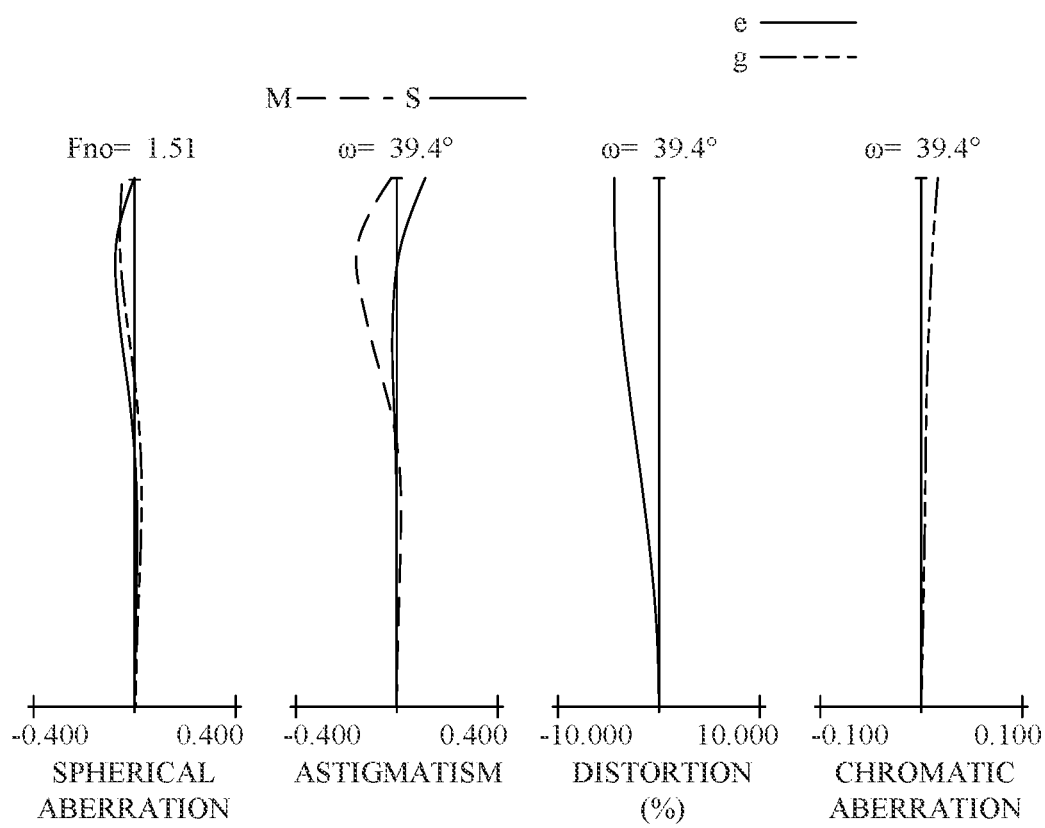
FIGS. 7A, 7B, and 7C are longitudinal aberration diagrams of the zoom lens according to Example 3 at the wide-angle end, at a focal length of 38 mm, and at a telephoto end, in an in-focus state at infinity, respectively.
Figure 7B:
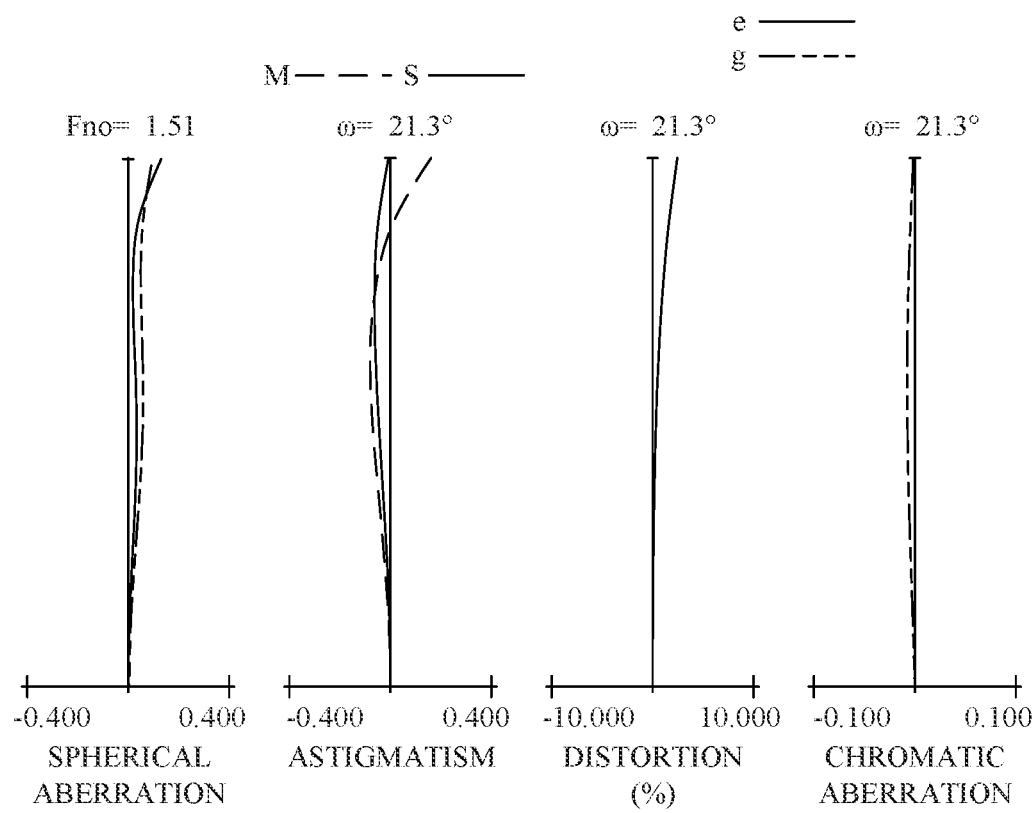
Figure 7C:
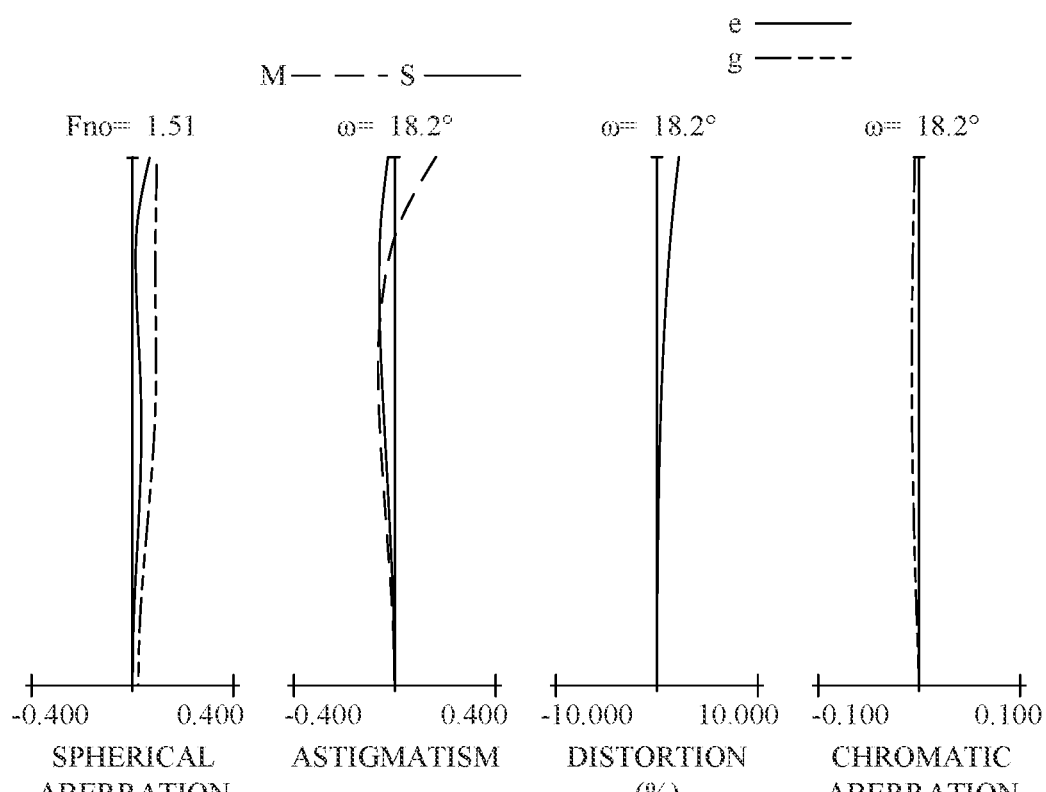
Figure 8:
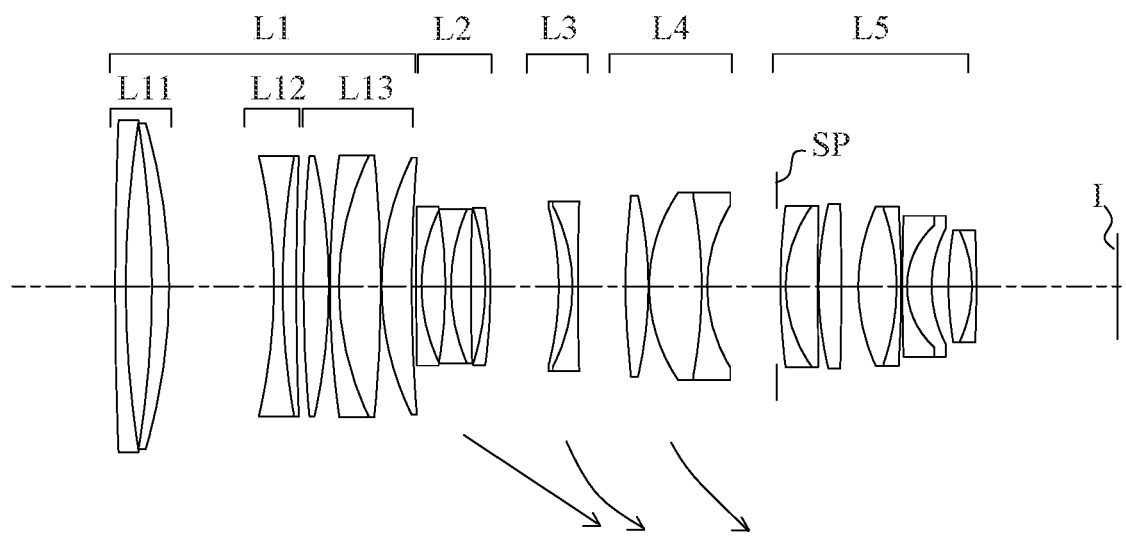
FIG. 8 is a sectional view of a zoom lens at a wide-angle end in an in-focus state at infinity in Example 4.
Figure 9A:
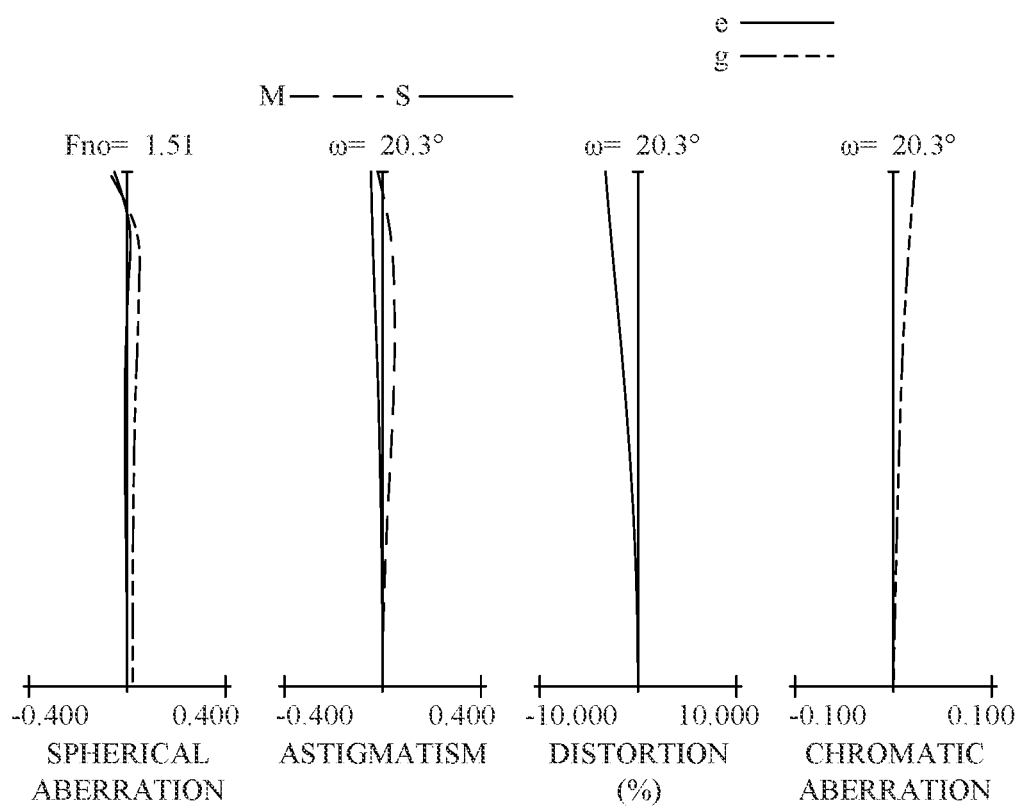
FIGS. 9A, 9B, and 9C are longitudinal aberration diagrams of the zoom lens according to Example 4 at the wide-angle end, at a focal length of 85 mm, and at a telephoto end, in an in-focus state at infinity, respectively.
Figure 9B:
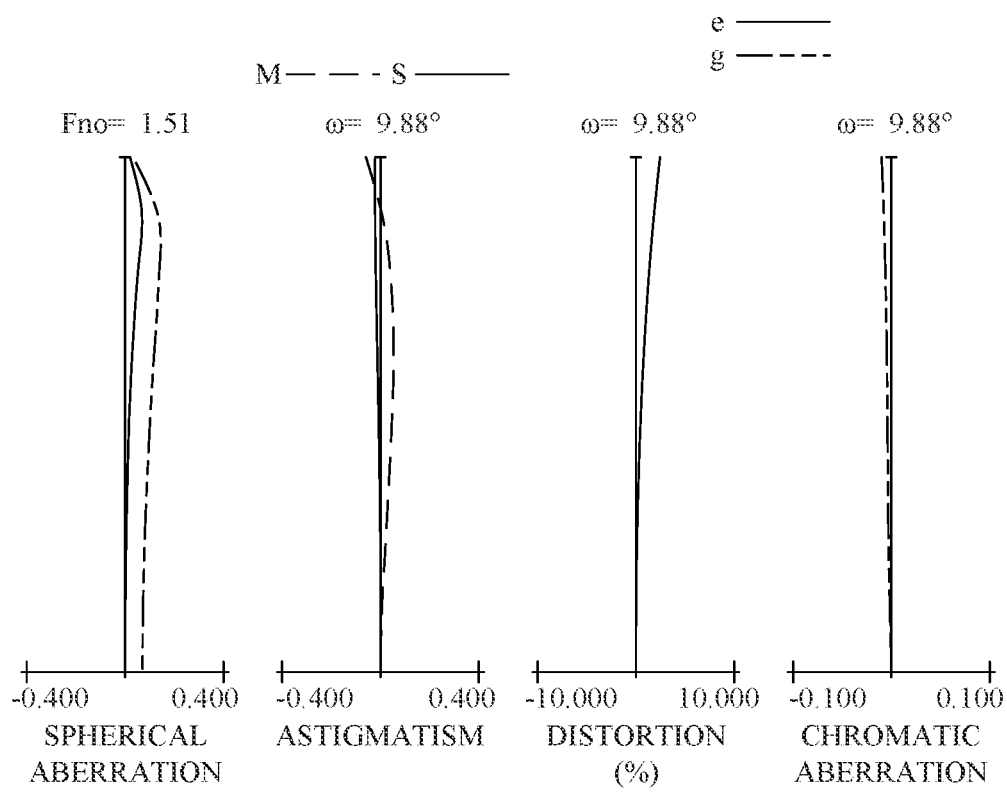
Figure 9C:
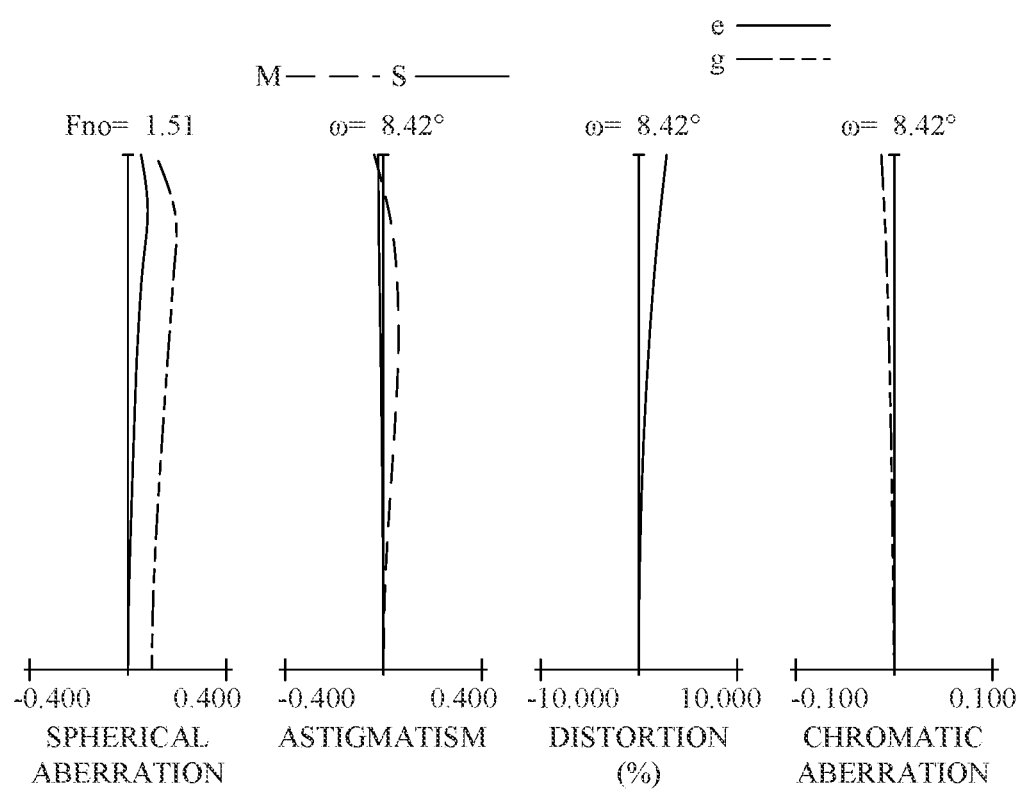
Figure 10:
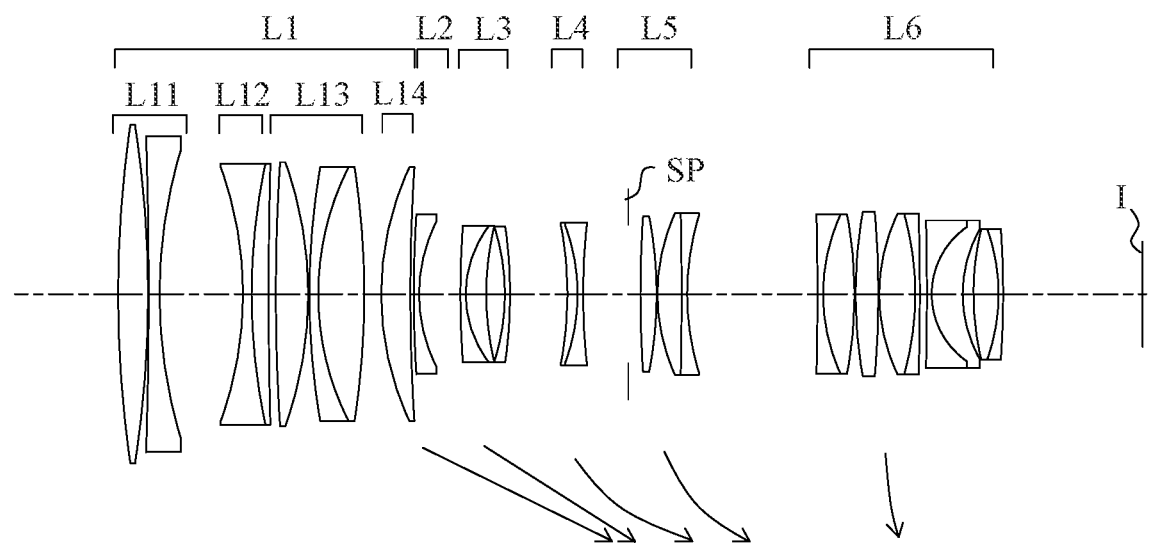
FIG. 10 is a sectional view of a zoom lens according to Example 5 at a wide-angle end in an in-focus state at infinity.
Figure 11A:
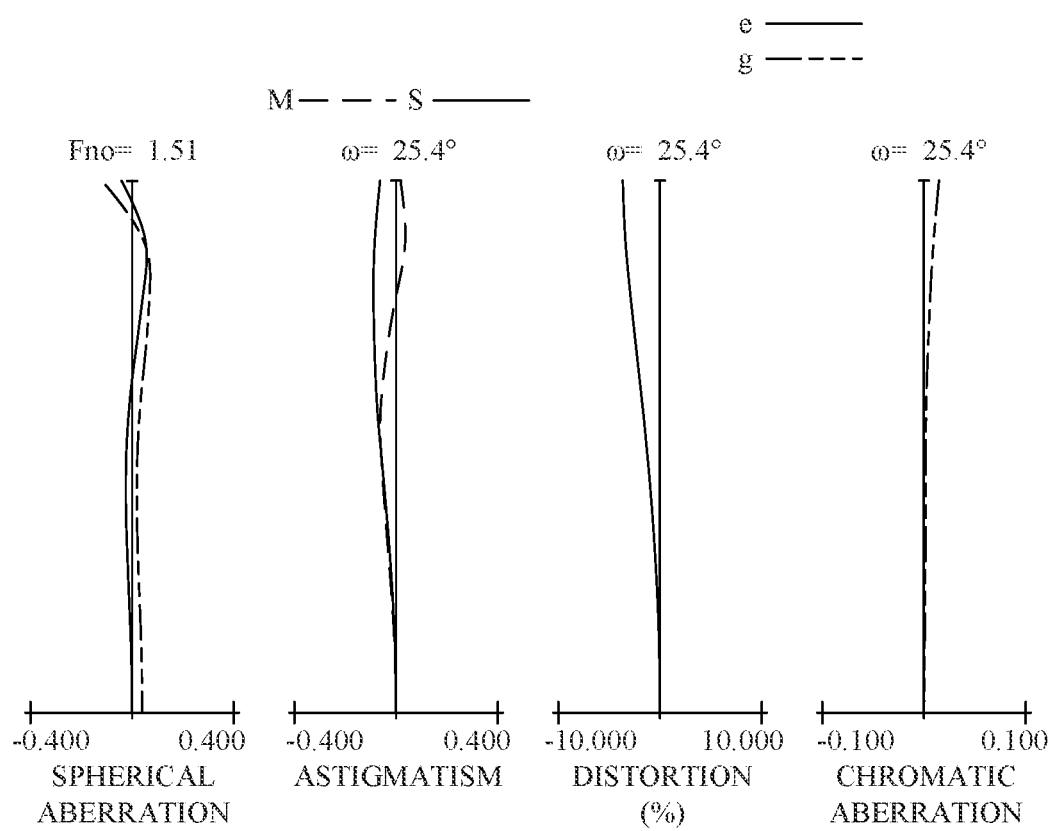
FIGS. 11A, 11B, and 11C are longitudinal aberration diagrams of the zoom lens according to Example 5 at the wide-angle end, at a focal length of 70 mm, and at a telephoto end, in an in-focus state at infinity, respectively.
Figure 11B:
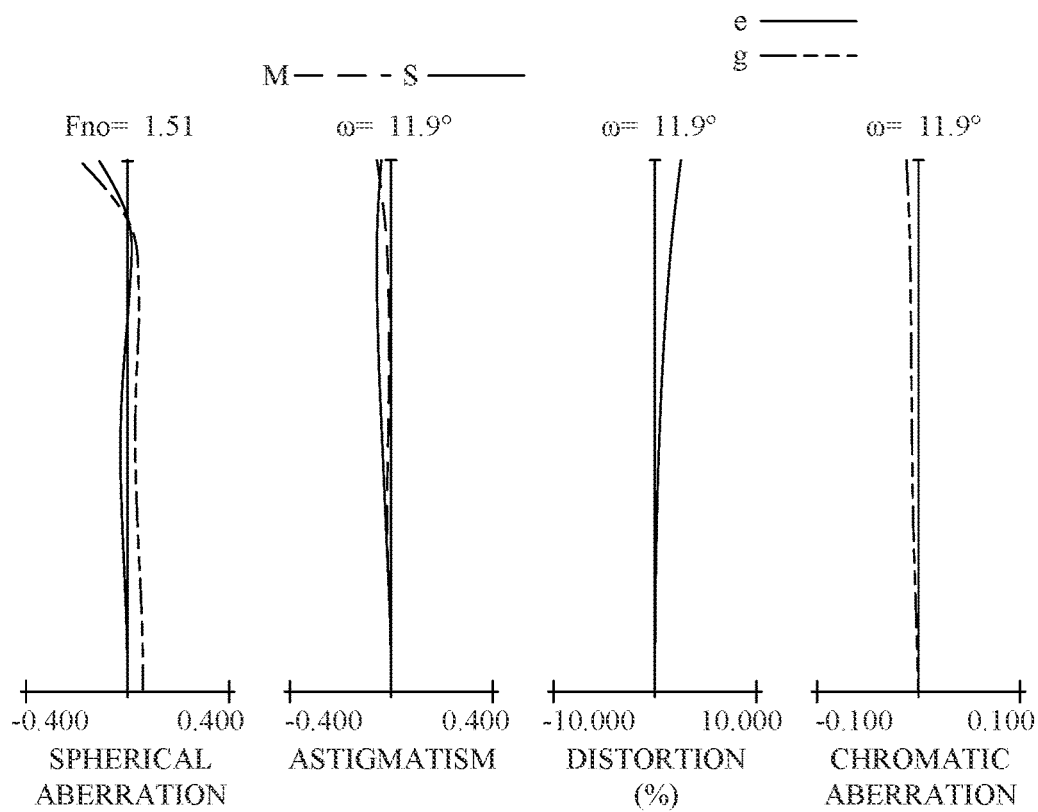
Figure 11C:
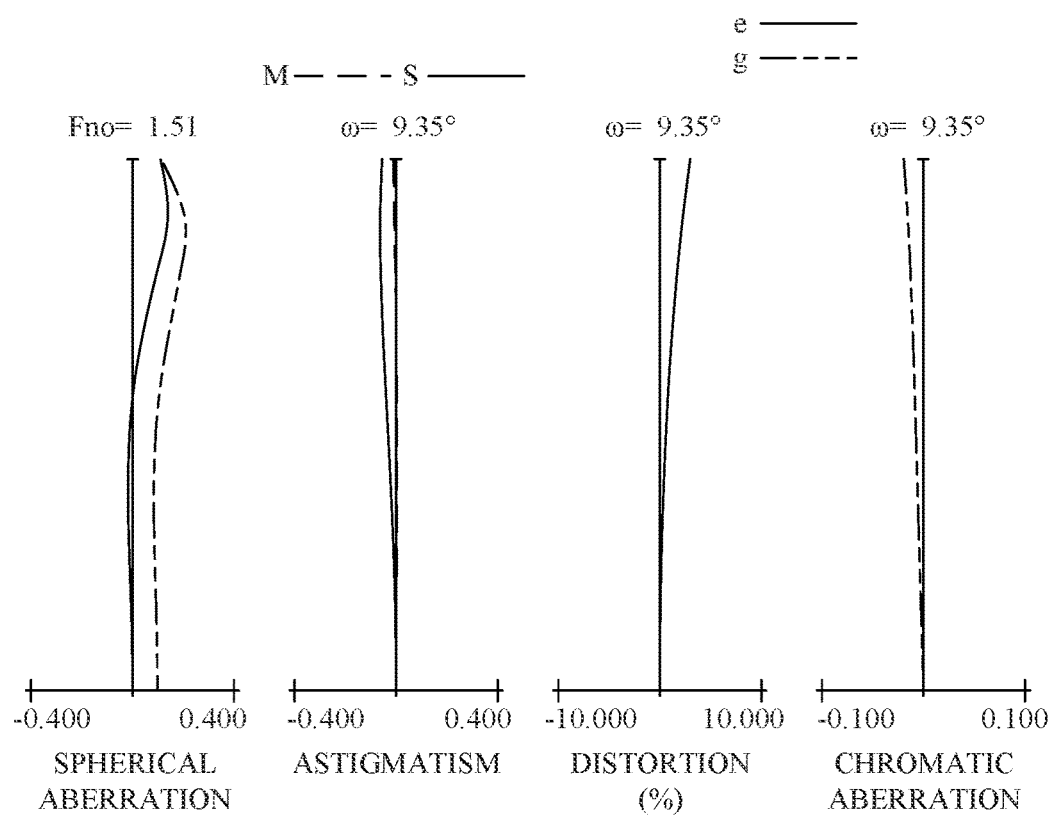
Figure 12:
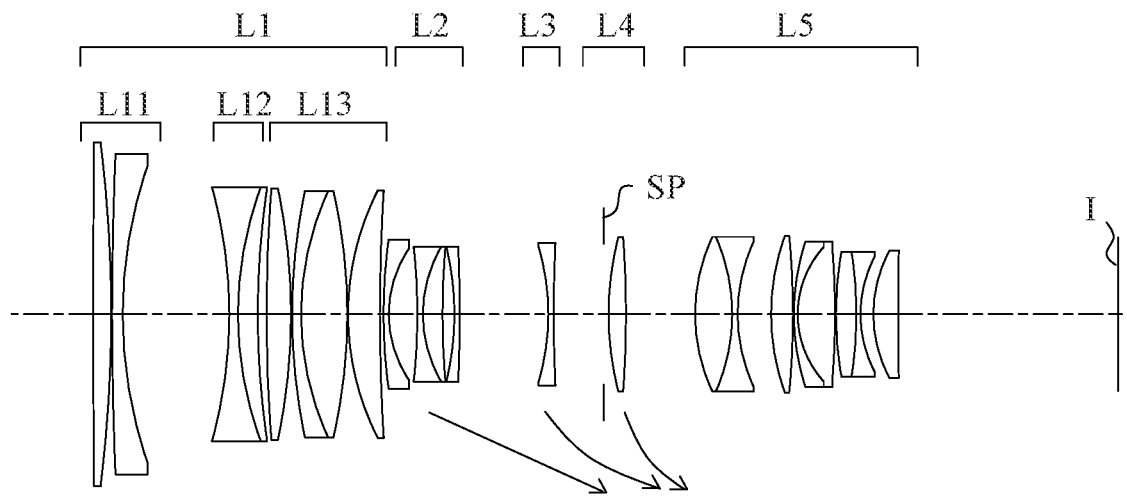
FIG. 12 is a sectional view of a zoom lens according to Example 6 at a wide-angle end in an in-focus state at infinity.
Figure 13A:
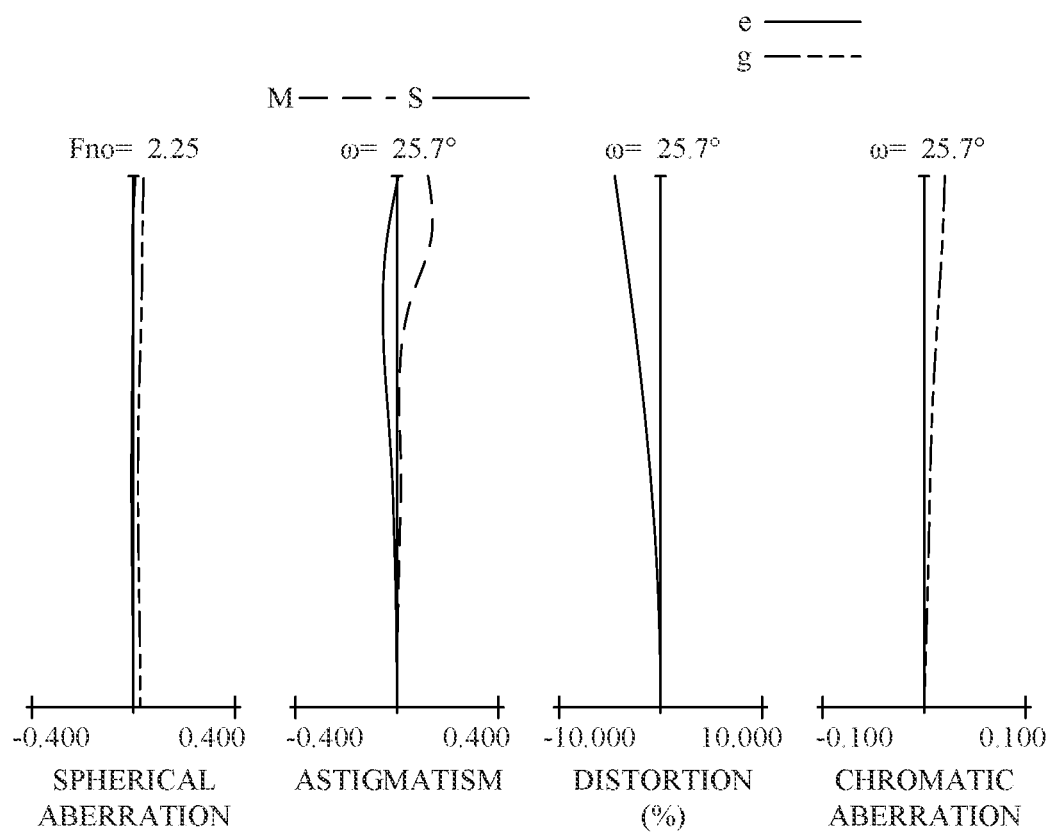
FIGS. 13A, 13B, and 13C are longitudinal aberration diagrams of the zoom lens according to Example 6 at the wide-angle end, at a focal length of 104 mm, and at a telephoto end, in an in-focus state at infinity, respectively.
Figure 13B:
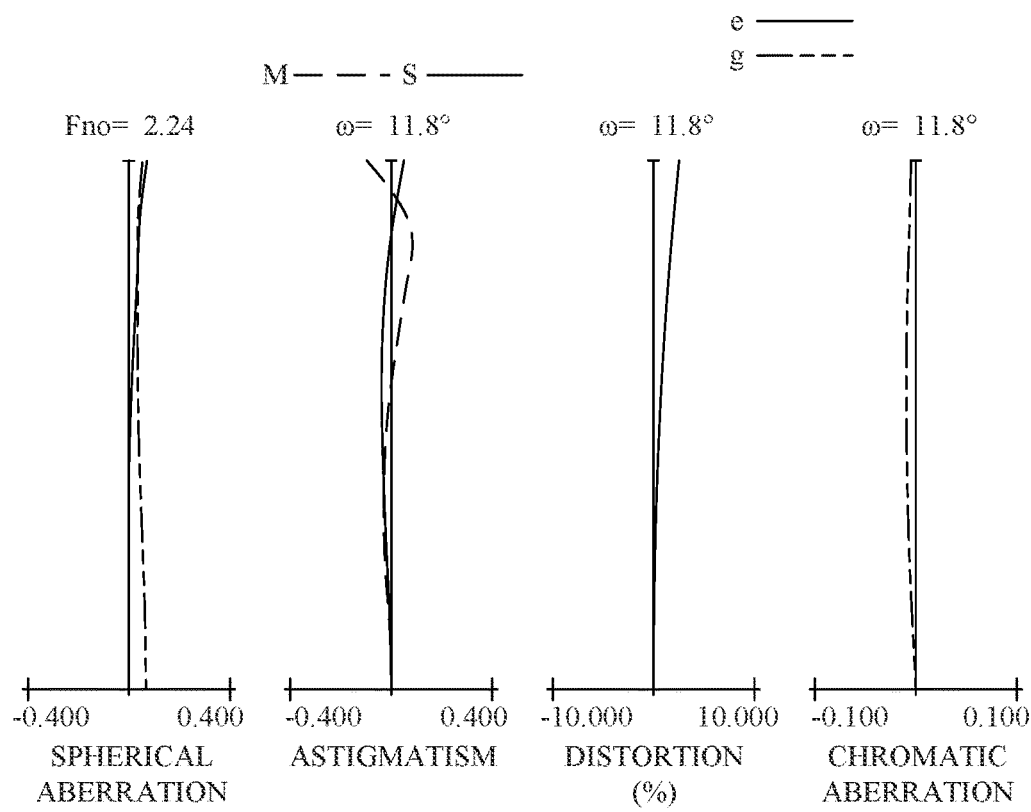
Figure 13C:
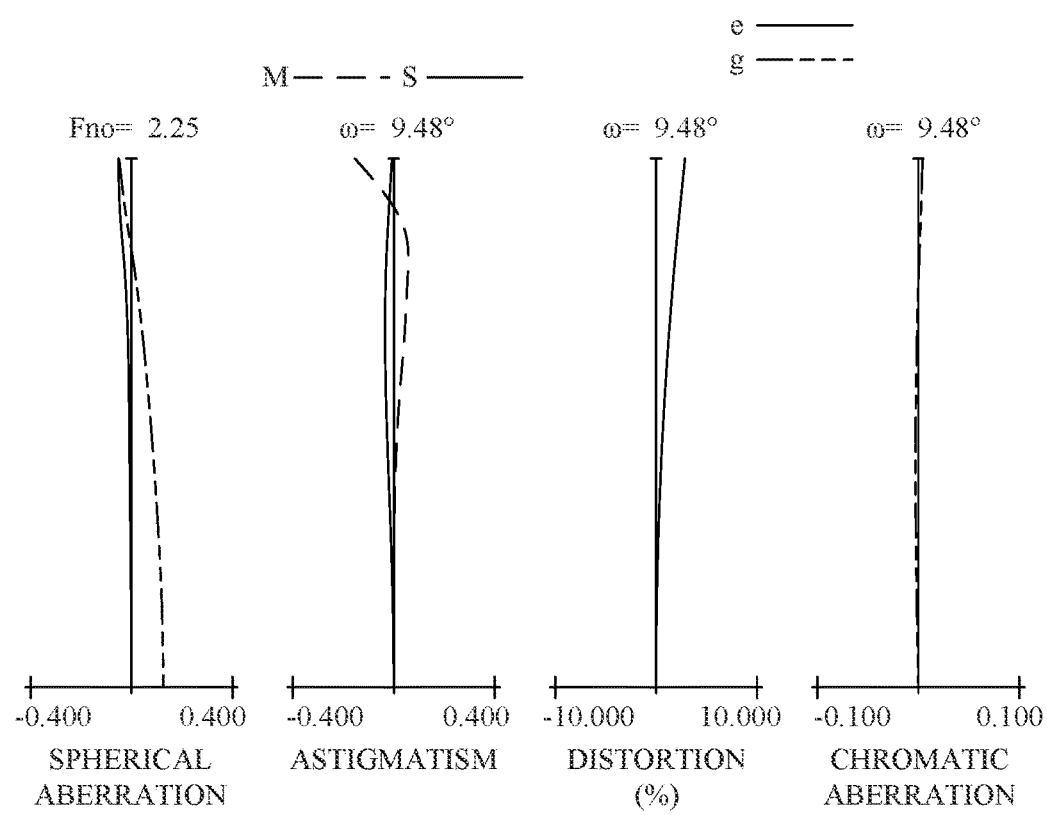
Figure 14:
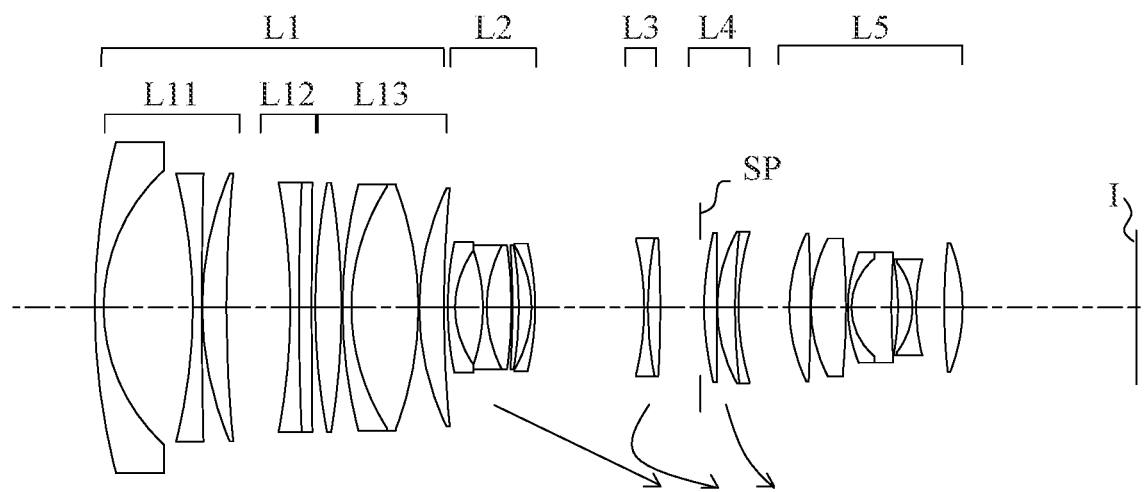
FIG. 14 is a sectional view of a zoom lens according to Example 7 at a wide-angle end in an in-focus state at infinity.
Figure 15A:
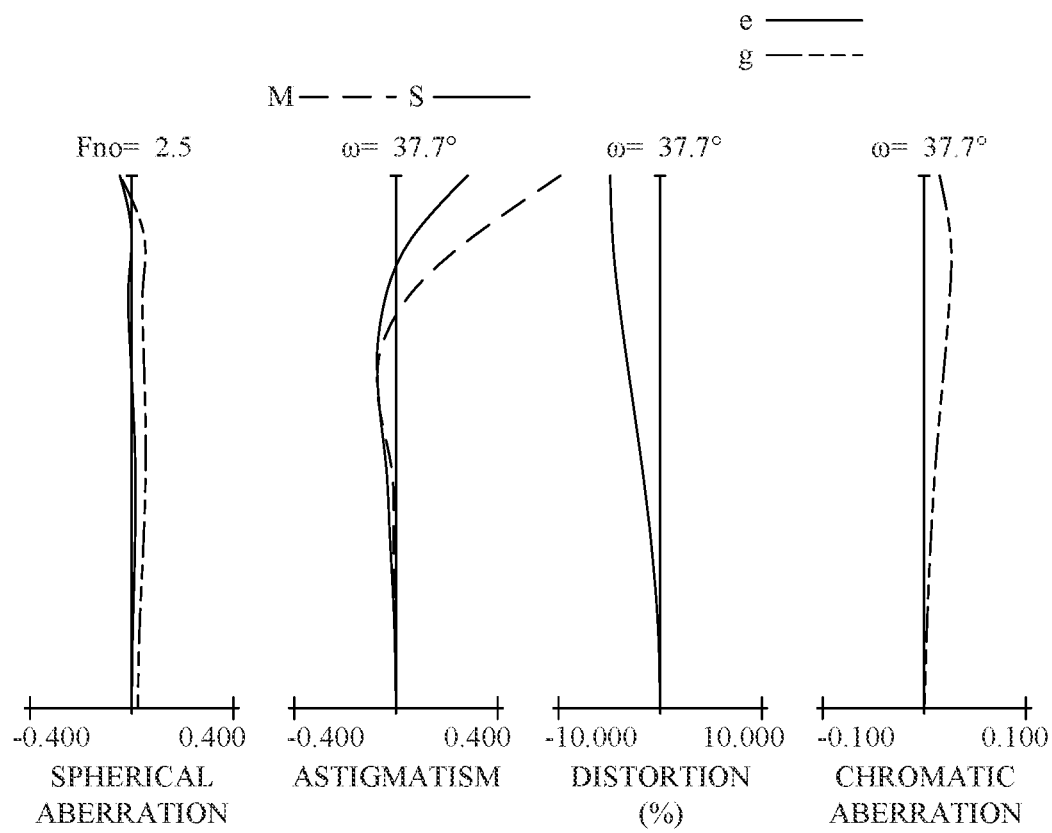
FIGS. 15A, 15B, and 15C are longitudinal aberration diagrams of the zoom lens according to Example 7 at the wide-angle end, at a focal length of 80 mm, and at a telephoto end, in an in-focus state at infinity, respectively.
Figure 15B:
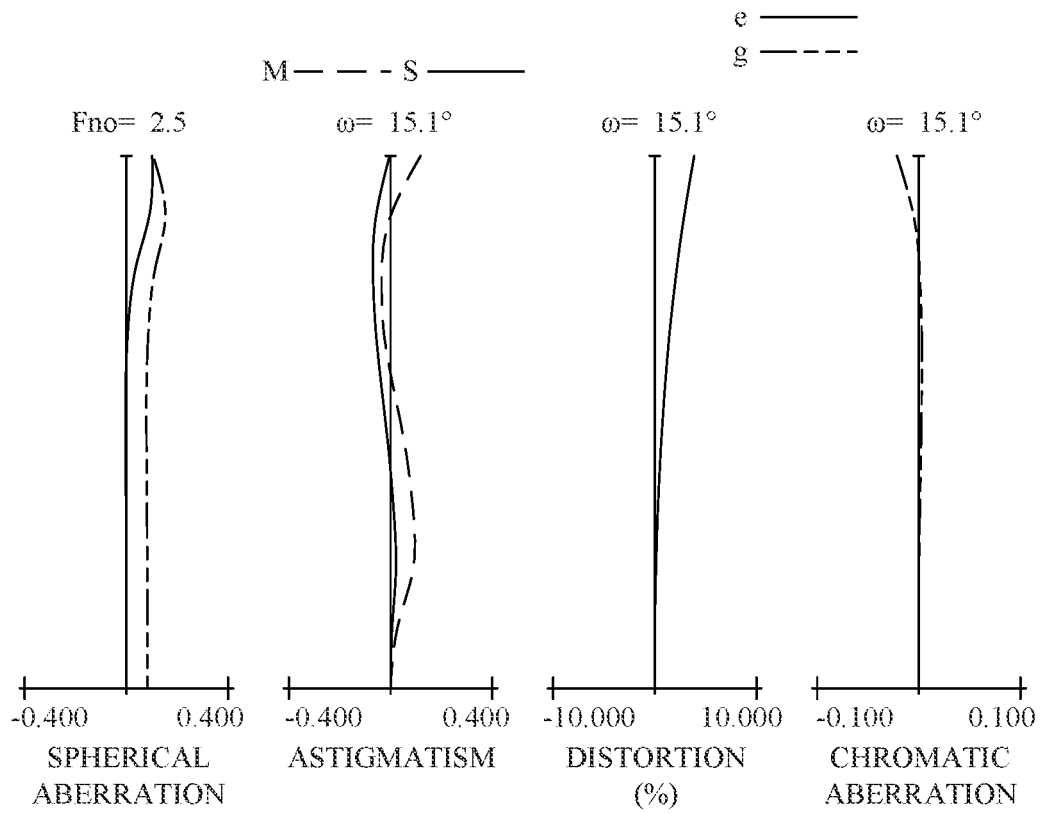
Figure 15C:
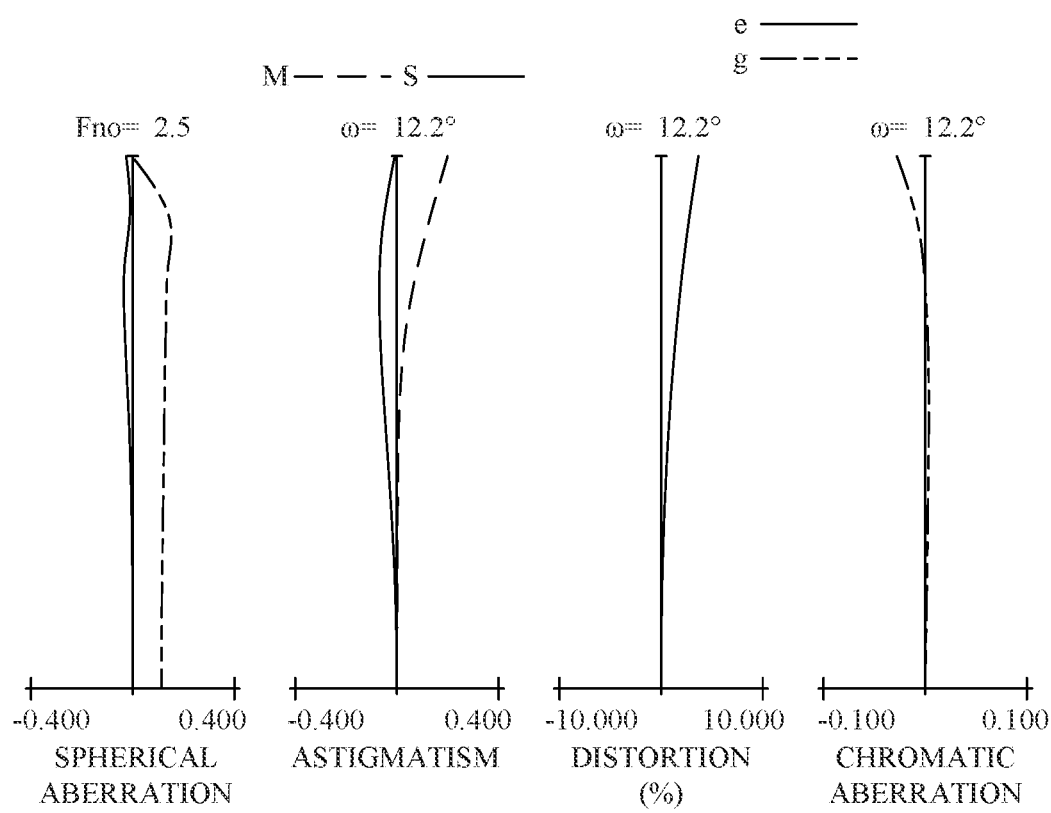
Figure 16:
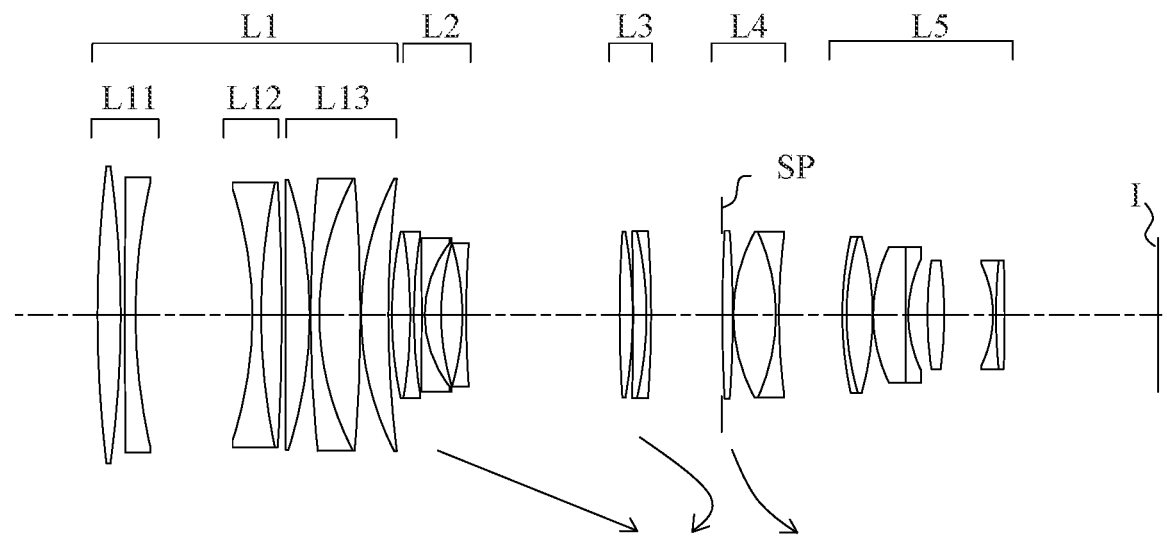
FIG. 16 is a sectional view of a zoom lens according to Example 8 at a wide-angle end in an in-focus state at infinity.
Figure 17A:
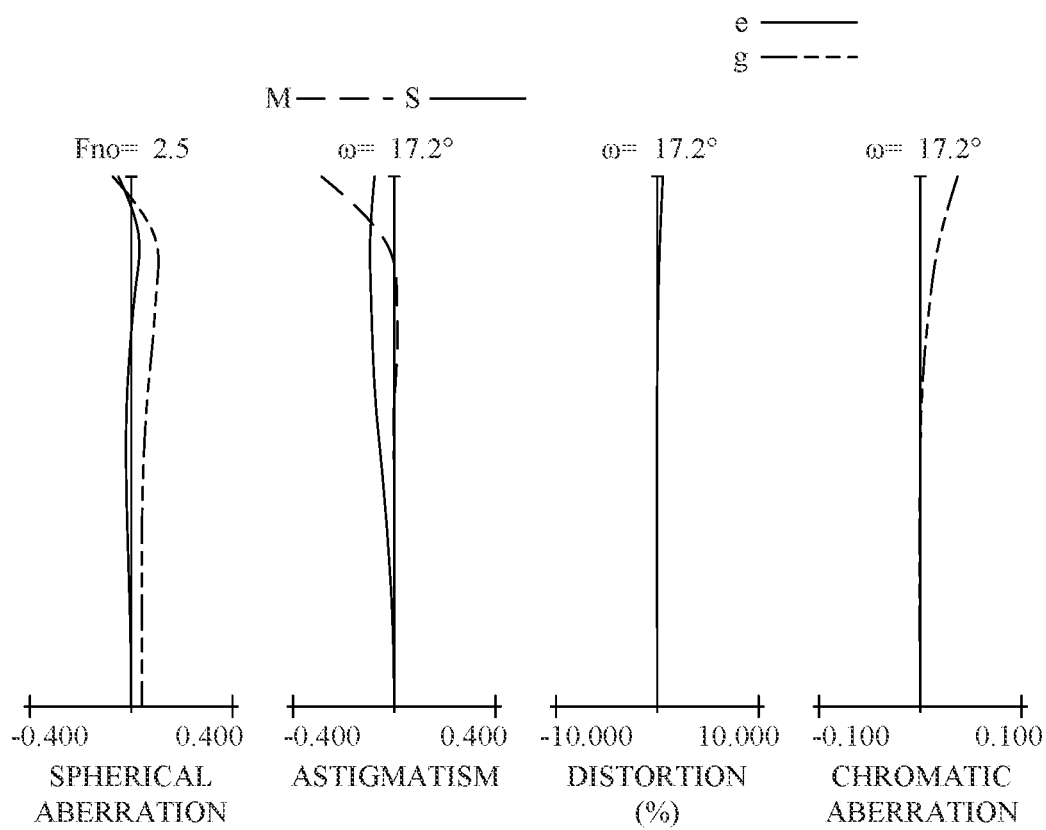
FIGS. 17A, 17B, and 17C are longitudinal aberration diagrams of the zoom lens according to Example 8 at the wide-angle end, at a focal length of 170 mm, and at a telephoto end, in an in-focus state at infinity, respectively.
Figure 17B:
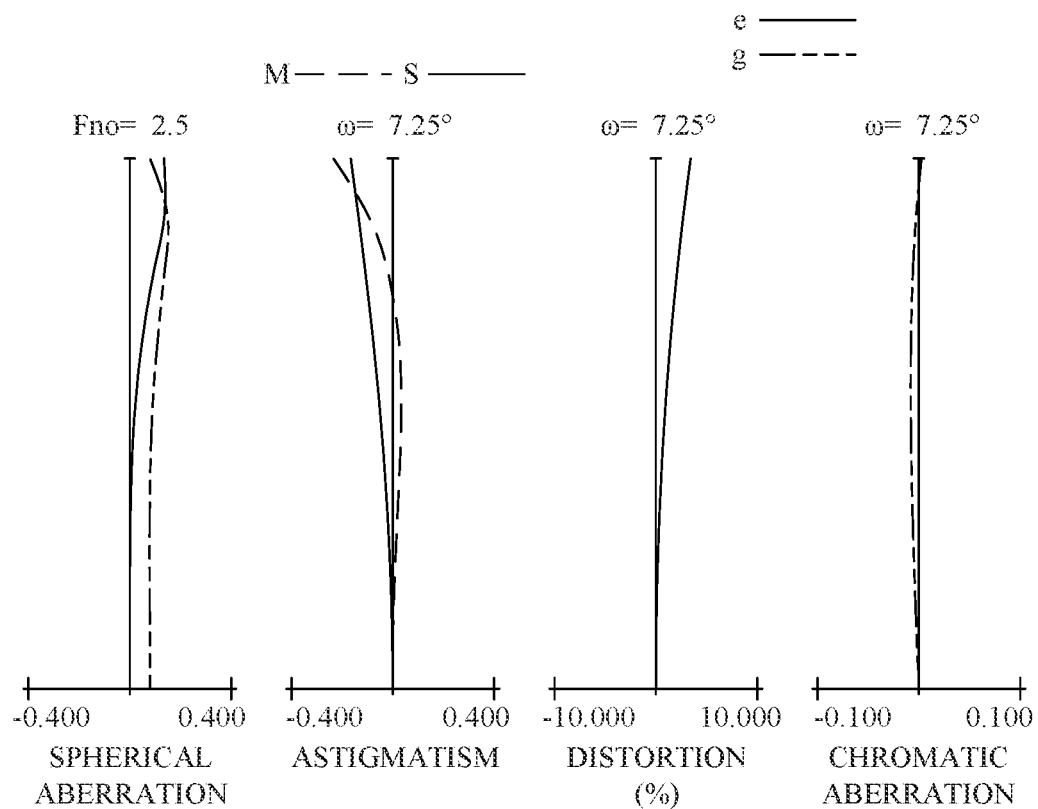
Figure 17C:
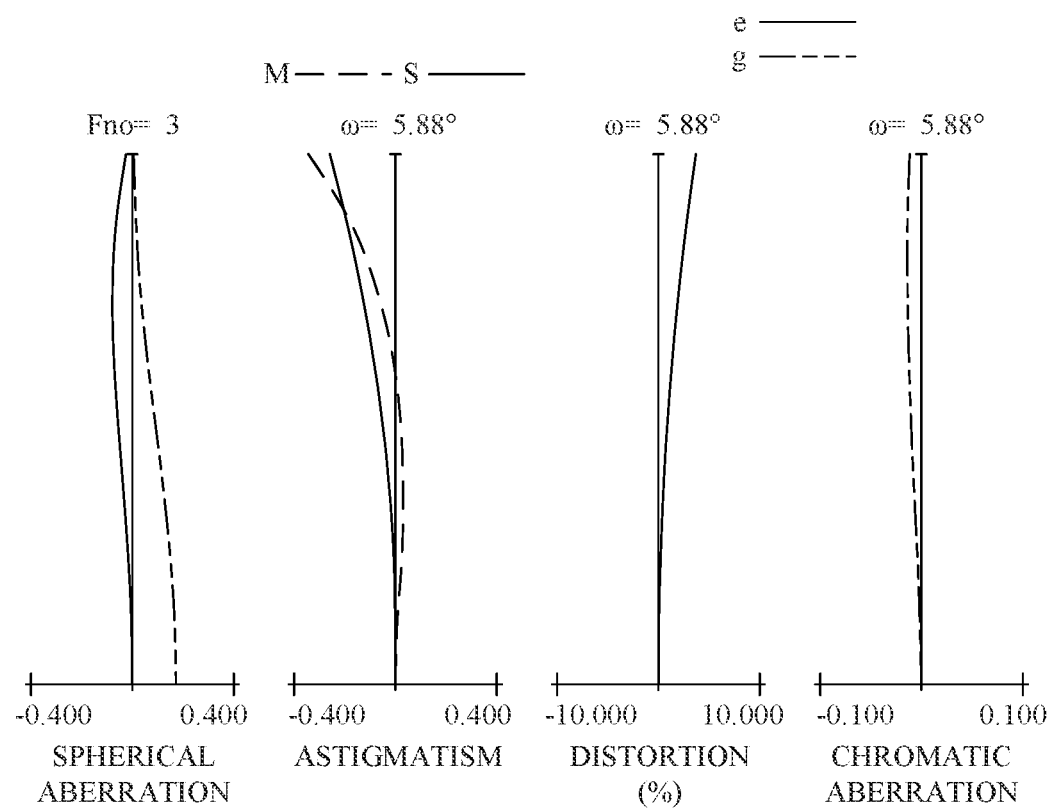
Figure 18:
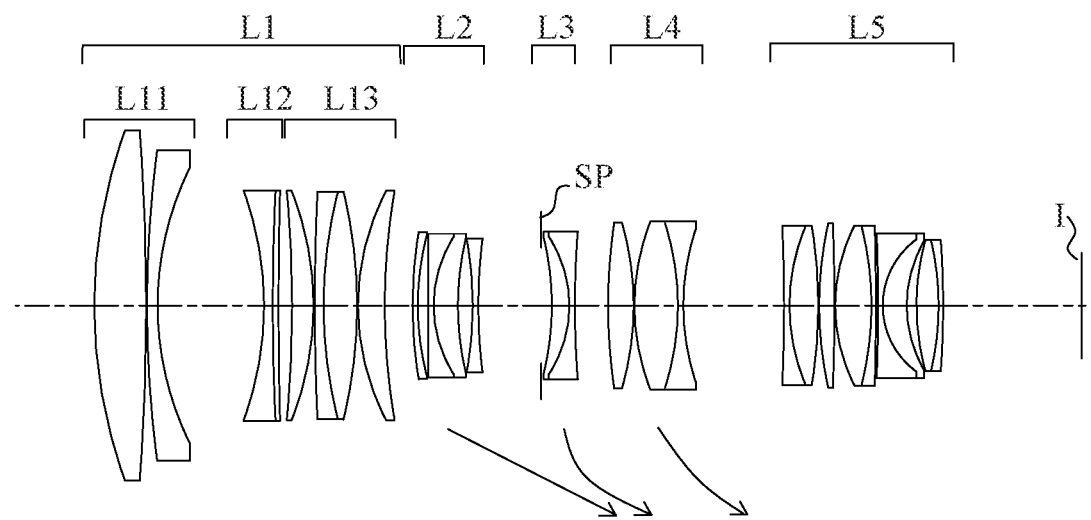
FIG. 18 is a sectional view of a zoom lens according to Example 9 at the wide-angle end in an in-focus state at infinity.
Figure 19A:
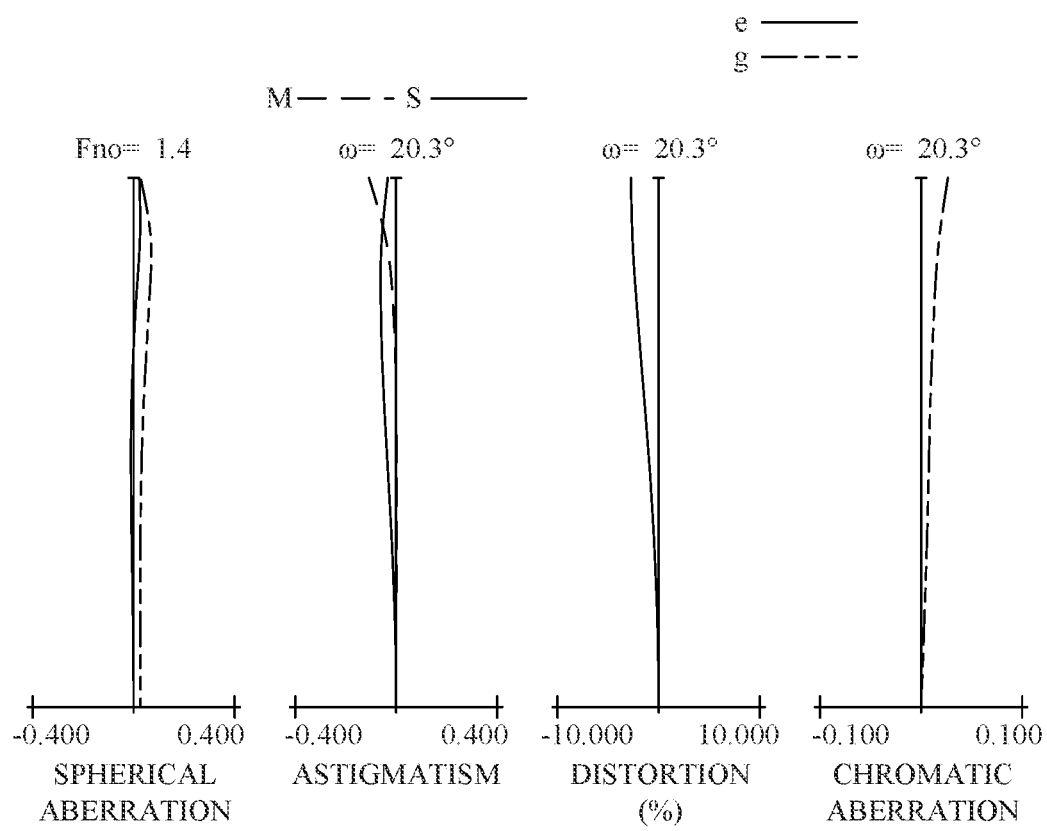
FIGS. 19A, 19B, and 19C are longitudinal aberration diagrams of the zoom lens according to Example 9 at the wide-angle end, at a focal length of 73 mm, and at the telephoto end, in an in-focus state at infinity, respectively.
Figure 19B:
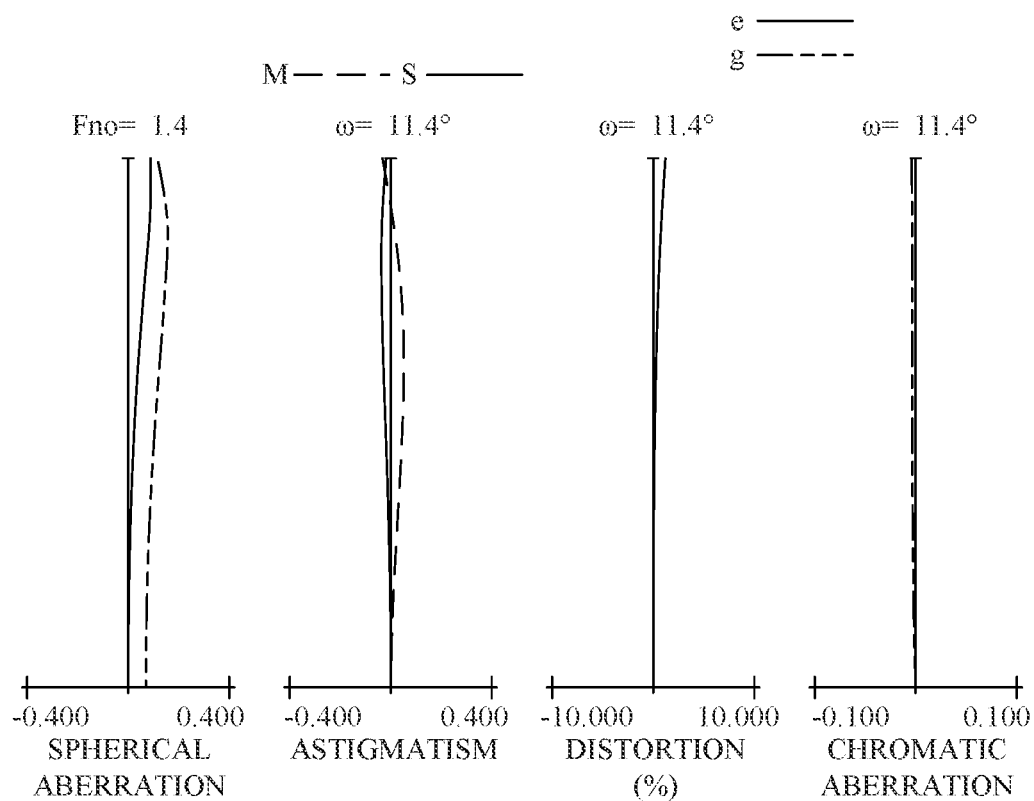
Figure 19C:
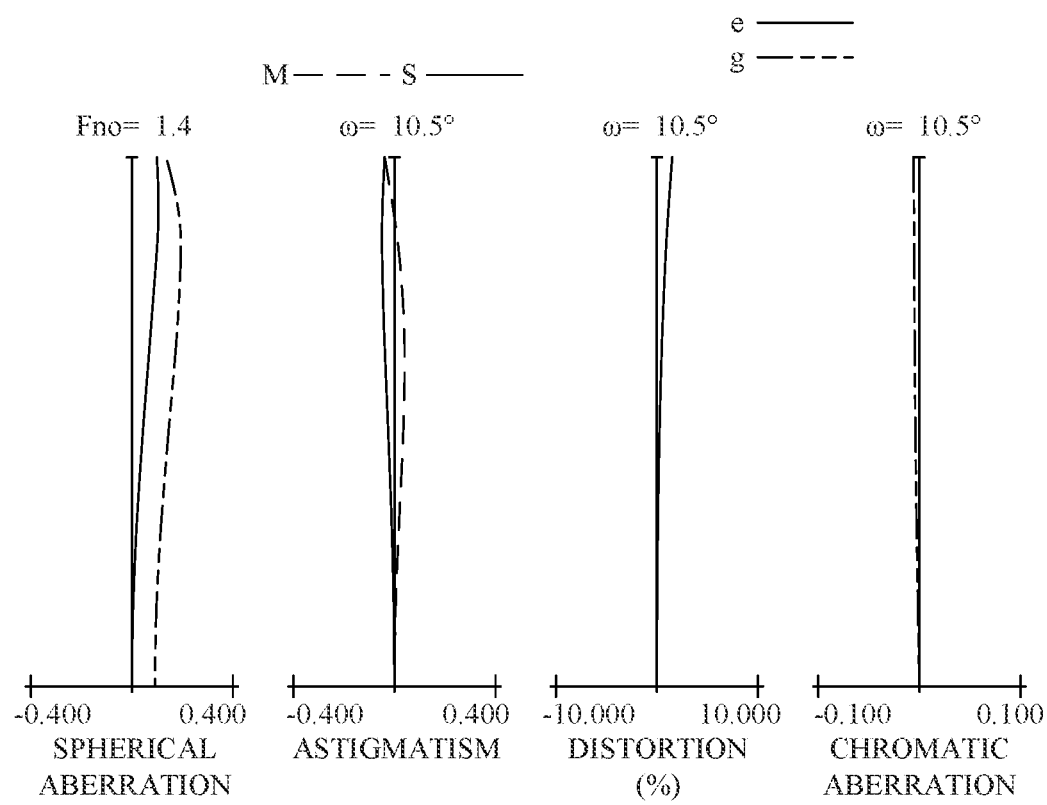

Referring now to FIGS. 3A and 3B, a description will be given of an optical action of the first lens unit L1 having the configuration according to each example. FIGS. 3A and 3B are optical path diagrams of light rays passing through the first lens unit L1 in the zoom lens of Example 1 at the wide-angle end and at the telephoto end, in the in-focus state at infinity, respectively. As mentioned above, the second subunit L12 is moved along the optical axis during focusing. A lens diameter of the first subunit L11, which has the largest lens diameter among the lens units included in the first lens unit L1, is determined by an off-axis light beam at the wide-angle end in the in-focus state at infinity. Thus, when a larger aperture diameter is sought, the first subunit L11 may become larger in order to secure a sufficient peripheral illumination ratio at the wide-angle end. A lens diameter of the third subunit L13, which is the subsequent subunit L1R, is determined by an on-axis light beam that determines the F-number at the telephoto end in the in-focus state at infinity. The lens diameter of the third subunit L13 may become larger when the larger aperture diameter is sought. Accordingly, this example properly sets a focal length of the subsequent subunit L1R, and reduces a moving amount of the second subunit L12 during focusing, thereby thinning the first lens unit L1 and suppressing an increase of the diameter of the first subunit L11 associated with the larger aperture diameter.

In the zoom lens according to each example, a sensitivity ES of the second subunit L12, which is a focus unit movable during focusing, can be expressed by the following equation.

$$ES=(1-\beta 12^2)\beta 13^2 \beta 2^2 \ldots \beta n^2$$

where β12 is a lateral magnification of the second subunit L12, β13, β2, and βn are lateral magnifications of the lens units disposed on the image side of the subsequent subunit L1R, the second lens unit L2, and the second lens unit L2, respectively.

The larger, the sensitivity ES becomes, the smaller, the moving amount of the second subunit L12 becomes from the infinity object to the short-distance object. From the above expression, once the focal lengths of the zoom lens and the first lens unit L1 are determined, the sensitivity ES can be increased by reducing the lateral magnification β12 and by increasing the lateral magnification β13. The zoom lens according to each example can reduce the lateral magnification β12 and increase the lateral magnification β13 by reducing the focal length of the subsequent subunit L1R. Since the moving amount of the second subunit L12 during focusing can be reduced, and the thickness of the first lens unit L1 can be reduced, an increase in the lens diameter of the first subunit L11 along with the increased aperture diameter can be suppressed.

The inequality (1) defines a ratio of the focal length of the subsequent subunit L1R to the focal length of the first lens unit L1. Reducing the focal length of the subsequent subunit L1R can also reduce the focal length of the second subunit L12. As a result, the lateral magnification β12 of the second subunit L12 can be reduced, the lateral magnification β1R of the subsequent subunit L1R can be increased, and the moving amount of the second subunit L12 during focusing can be reduced. That is, satisfying the inequality (1) can make small the zoom lens and provide a high optical performance. If the ratio of the focal length of the subsequent subunit L1R to the focal length of the first lens unit L1 is higher than the upper limit in the inequality (1), the moving amount of the second subunit L12 during focusing is increased. Therefore, the thickness of the first lens unit L1 increases and the lens diameter increases, making it difficult to reduce the size of the zoom lens. If the ratio of the focal length of the subsequent subunit L1R to the focal length of the first lens unit L1 becomes lower than the lower limit in the conditional equation (1), it becomes difficult to correct the aberration at the telephoto end.

The above configuration can provide a small and lightweight zoom lens having a large aperture diameter and a high optical performance over the entire zoom range.

The numerical range of the inequality (1) may be replaced with that of the following inequality (1a).

$$0.30 < f1R/f1 < 1.00 \quad (1a)$$

The numerical range of the inequality (1) may be replaced with that of the following inequality (1b).

$$0.40 < f1R/f1 < 0.95 \quad (1b)$$

Next follows a description of a configuration which the zoom lens according to each example may satisfy.

The zoom lens according to each example may include a diaphragm configured to move along the optical axis during zooming. Due to the movable diaphragm, it becomes easy to dispose the diaphragm position on the object side at the wide-angle end, so that the effects of moving the entrance pupil toward the object side and of reducing the lens diameter of the first lens unit L1 can be easily achieved.

The plurality of zooming lens units may include three or more lens units. Zooming with three or more lens units can easily correct the aberration that increases along with the increased aperture diameter, and realize a high optical performance over the entire zoom range.

The subsequent subunit L1R may include a third subunit L13 having a positive refractive power. Since the subsequent subunit L1R includes a single lens unit, the first lens unit L1 can be thin, an increase in the lens diameter of the first lens unit L1 can be suppressed, and the zoom lens can be made small and lightweight. The third subunit L13, which is one lens unit constituting the subsequent subunit L1R, may be fixed during (or is not moved for) focusing. Thereby, the aberration fluctuation during focusing is reduced over the entire zoom range.

Next follows a description of conditions which the zoom lens according to each example may satisfy. The zoom lens according to each example may satisfy one or more of the following inequalities (2) to (6):

$$0.20 < L1/f1 < 2.00 \quad (2)$$

$$-4.80 < f12/f1 < -0.20 \quad (3)$$

$$-6.50 < f1/f2 < -1.35 \quad (4)$$

$$-0.60 < \beta 12/\beta 1R < 0.00 \quad (5)$$

$$0.00 < (Rn1-Rn2)/(Rn1+Rn2) < 5.00 \quad (6)$$

where L1 is a distance on the optical axis from a surface closest to the object in the first lens unit L1 to a surface closest to the image plane in the first lens unit L1, f12 is a focal length of the second subunit L12 in the in-focus state at infinity, f2 is a focal length of the second lens unit L2, β12 is a lateral magnification of the second subunit L12, β1R is a lateral magnification of the subsequent subunit L1R, Rn1 is a radius of curvature of a surface on the object side of a first lens closest to the image plane among lenses having negative refractive powers included in the first subunit L11, and Rn2 is a radius of curvature of a surface on the image side of the first lens.

The inequality (2) defines a ratio of the distance on the optical axis from the surface closest to the object in the first lens unit L1 to the surface closest to the image plane in the first lens unit L1 to the focal length of the first lens unit L1. Satisfying the inequality (2) can realize a large aperture diameter, a small size, a light weight, and a high optical performance. If the first lens unit L1 becomes thicker beyond the upper limit in the inequality (2), the lens diameter of the first lens unit L1 increases, and the miniaturization becomes difficult. In addition, the focal length of the first lens unit L1 becomes small, and it becomes difficult to sufficiently correct aberrations. If the first lens unit L1 becomes thinner below the lower limit in the inequality (2), the number of usable lenses decreases, and it becomes difficult to sufficiently correct aberrations.

The inequality (3) defines a ratio of the focal length of the second subunit L12 to the focal length of the first lens unit L1. Satisfying the inequality (3) can realize a large aperture diameter, a small size, a light weight, and a high optical performance during focusing. If the focal length of the second subunit L12 becomes smaller beyond the upper limit in the inequality (3), it becomes difficult to correct the aberration fluctuation during focusing from the infinity object to the short-distance object. When the focal length of the second subunit L12 becomes larger below the lower limit in the inequality (3), a distance (interval) required during focusing from the infinity object to the short-distance object increases, and the first lens unit L1 becomes thicker. As a result, the first lens unit L1 becomes thicker, the lens diameter increases, making it difficult to reduce the size and weight.

The inequality (4) defines a ratio of the focal length of the first lens unit L1 to the focal length of the second lens unit L2. Satisfying the inequality (4) can realize a large aperture diameter, a small size, a light weight, and a high optical performance during focusing. If the focal length of the first lens unit L1 increases beyond the upper limit in the inequality (4), the thickness of the first lens unit L1 increases and the lens diameter increases, making it difficult to reduce the size and weight of the zoom lens. If the focal length of the first lens unit L1 becomes smaller below the lower limit in the inequality (4), it is advantageous for the miniaturization, but it becomes difficult to correct the aberration.

The inequality (5) defines a ratio of the lateral magnification of the second subunit L12 to the lateral magnification of the subsequent subunit L1R. Satisfying the inequality (5) can realize a large aperture diameter, a small size, and a light weight. If the lateral magnification of the second subunit L12 becomes smaller or the lateral magnification of the subsequent subunit L1R becomes larger beyond the upper limit in the inequality (5), it becomes difficult to correct the aberration. If the lateral magnification of the second subunit L12 becomes larger or the lateral magnification of the subsequent subunit L1R becomes smaller below the lower limit in the inequality (5), the moving amount of the second subunit L12 during focusing becomes larger. As a result, the first lens unit L1 becomes thicker and the lens diameter increases, making it difficult to miniaturize the zoom lens.

The inequality (6) defines a ratio of the curvature of the surface on the object side of the first lens closest to the image plane among the lenses having the negative refractive powers included in the first subunit L11 to the surface on the image side of the first lens. If the value is higher than the upper limit in the inequality (6), the surface on the object side of the first lens becomes a concave surface, and the off-axis light rays are significantly refracted especially at the wide-angle end and it becomes difficult to suppress the fluctuation of the off-axis aberration during focusing. If the value is lower than the lower limit in the inequality (6), the surface on the image side of the first lens becomes a convex surface, and it becomes difficult to suppress the fluctuation of the off-axis aberration during focusing.

The numerical ranges of the inequalities (2) to (6) may be replaced with those of the following inequalities (2a) to (6a).

$$0.30 < L1/f1 < 1.80 \quad (2a)$$

$$-4.70 < f12/f1 < -0.40 \quad (3a)$$

$$-5.00 < f1/f2 < -1.40 \quad (4a)$$

$$-0.49 < \beta12/\beta1R < -0.02 \quad (5a)$$

$$0.20 < (Rn1-Rn2)/(Rn1+Rn2) < 3.00 \quad (6a)$$

The numerical ranges of the inequalities (2) to (6) may be replaced with those of the following inequalities (2b) to (6b).

$$0.40 < L1/f1 < 1.60 \quad (2b)$$

$$-4.60 < f12/f1 < -0.60 \quad (3b)$$

$$-3.50 < f1/f2 < -1.45 \quad (4b)$$

$$-0.40 < \beta12/\beta1R < -0.04 \quad (5b)$$

$$0.40 < (Rn1-Rn2)/(Rn1+Rn2) < 1.50 \quad (6b)$$

A detailed description will now be given of the zoom lens according to each example.

The zoom lens according to Example 1 includes, in order from the object side to the image side, first to fifth lens units L1 to L5 having positive, negative, negative, positive, and positive refractive powers. The fifth lens unit L5 is a final lens unit. The first lens unit L1 and the fifth lens unit L5 are a focus lens unit and an imaging lens unit, respectively. The second to fourth lens units L2 to L4 are zooming lens units that are moved during zooming. During zooming, the fourth lens unit L4 is moved non-linearly on the optical axis in association with movements of the second lens unit L2 and the third lens unit L3, and corrects the image plane fluctuation along with zooming. The first lens unit L1 and the fifth lens unit L5 are fixed during (or are not moved for) zooming. The diaphragm SP is included in the fourth lens unit L4 and is closest to the object side in the fourth lens unit L4.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (or are not moved for) focusing. The second subunit L12 is moved to the object side during focusing from the infinity object to the short-distance object. The first subunit L11 corresponds to first to fourth surfaces, the second subunit L12 corresponds to fifth to seventh surfaces, and the third subunit L13 corresponds to eighth to fourteenth surfaces.

The zoom lens according to Example 2 includes, in order from the object side to the image side, first to fourth lens units L1 to L4 having positive, negative, positive, and positive refractive powers. The fourth lens unit L4 is a final lens unit. The first lens unit L1 and the fourth lens unit L4 are a focus lens unit and an imaging lens unit, respectively. The second lens unit L2 and the third lens unit L3 are zooming lens units that are moved during zooming. During zooming, the third lens unit L3 is moved non-linearly on the optical axis in association with movement of the second lens unit L2, and corrects the image plane fluctuation during zooming. The first lens unit L1 and the fourth lens unit L4 are fixed during (are not moved for) zooming. The diaphragm SP is disposed between the second lens unit L2 and the third lens unit L3, and is moved independently of each lens unit during zooming.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (are not moved for) focusing. The second subunit L12 is moved to the object side during focusing from the infinity object to the short-distance object. The first subunit L11 corresponds to first to fourth surfaces, the second subunit L12 corresponds to fifth to seventh surfaces, and the third subunit L13 corresponds to eighth to fourteenth surfaces.

The zoom lens according to Example 3 includes, in order from the object side to the image side, first to fifth lens units L1 to L5 having positive, negative, negative, positive, and positive refractive powers. The fifth lens unit L5 is a final lens unit. The first lens unit L1 and the fifth lens unit L5 are a focus lens unit and an imaging lens unit, respectively. The second to fourth lens units L2 to L4 are zooming lens units that are moved during zooming. During zooming, the fourth lens unit L4 is moved non-linearly on the optical axis in association with movements of the second lens unit L2 and the third lens unit L3, and corrects the image plane fluctuation during zooming. The first lens unit L1 and the fifth lens unit L5 are fixed during (are not moved for) zooming. The diaphragm SP is included in the fourth lens unit L4 and the closest to the object in the fourth lens unit L4.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (are not moved for) focusing. The second subunit L12 is moved to the object side during focusing from the infinity object to the short-distance object. The first subunit L11 corresponds to first to sixth surfaces, the second subunit L12 corresponds to seventh to eleventh surfaces, and the third subunit L13 corresponds to twelfth to sixteenth surfaces.

The zoom lens according to Example 4 includes, in order from the object side to the image side, first to fifth lens units L1 to L5 having positive, negative, negative, positive, and positive refractive powers. The fifth lens unit L5 is a final lens unit. The first lens unit L1 and the fifth lens unit L5 are a focus lens unit and an imaging lens unit, respectively. The second to fourth lens units L2 to L4 are zooming lens units that are moved during zooming. During zooming, the fourth lens unit L4 is moved non-linearly on the optical axis in association with movements of the second lens unit L2 and the third lens unit L3, and corrects the image plane fluctuation during zooming. The first lens unit L1 and the fifth lens unit L5 are fixed during (are not moved for) zooming. The diaphragm SP is included in the fifth lens unit L5 and is closest to the object in the fifth lens unit L5.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (are not moved for) focusing. The second subunit L12 is moved to the object side during focusing from the infinity object to the short-distance object. The first subunit L11 corresponds to first to fourth surfaces, the second subunit L12 corresponds to fifth to seventh surfaces, and the third subunit L13 corresponds to eighth to fourteenth surfaces.

The zoom lens according to Example 5 includes, in order from the object side to the image side, first to sixth lens units L1 to L6 having positive, negative, negative, negative, positive, and positive refractive powers. The sixth lens unit L6 is a final lens unit. The first lens unit L1 is a focus lens unit. The second to sixth lens units L2 to L6 are zooming lens units that are moved during zooming. During zooming, the fifth lens unit L5 is moved non-linearly on the optical axis in association with movements of the second lens unit L2, the third lens unit L3, and the fourth lens unit L4 during zooming, and correct the image plane fluctuation. The first lens unit L1 is fixed during (is not moved for) zooming. The diaphragm SP is included in the fifth lens unit L5 and closest to the object in the fifth lens unit L5.

The first lens unit L1 includes, in order from the object side to the image side, a first subunit L11 having a negative refractive power, a second subunit L12 having a negative refractive power, a third subunit L13 having a positive refractive power, and a fourth subunit L14 having a positive refractive power. In this example, the third subunit L13 and the fourth subunit L14 form a subsequent subunit (at least one subsequent subunit) L1R. The first subunit L11 and the third subunit L13 are fixed during (are not moved for) focusing. The second subunit L12 and the fourth subunit L14 are moved to the object side during focusing from the infinity object to the short-distance object. The first subunit L11 corresponds to first to fourth surfaces, the second subunit L12 corresponds to fifth to seventh surfaces, the third subunit L13 corresponds to eighth to twelfth surfaces, and the fourth subunit L14 corresponds to thirteenth and fourteenth surfaces.

The zoom lens according to Example 6 includes, in order from the object side to the image side, first to fifth lens units L1 to L5 having positive, negative, negative, positive, and positive refractive powers. The fifth lens unit L5 is a final lens unit. The first lens unit L1 and the fifth lens unit L5 are a focus lens unit and an imaging lens unit, respectively. The second to fourth lens units L2 to L4 are zooming lens units that are moved during zooming. During zooming, the fourth lens unit L4 is moved non-linearly on the optical axis in association with movements of the second lens unit L2 and the third lens unit L3, and corrects the image plane fluctuation during zooming. The first lens unit L1 and the fifth lens unit L5 are fixed during (are not moved for) zooming. The diaphragm SP is included in the fourth lens unit L4 and closest to the object in the fourth lens unit L4. The diaphragm SP changes a diaphragm diameter during zooming.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (are not moved for) focusing. The second subunit L12 is moved to the object side during focusing from the infinity object to the short-distance object. The first subunit L11 corresponds to first to fourth surfaces, the second subunit L12 corresponds to fifth to seventh surfaces, and the third subunit L13 corresponds to eighth to fourteenth surfaces.

The zoom lens according to Example 7 includes, in order from the object side to the image side, first to fifth lens units L1 to L5 having positive, negative, negative, positive, and positive refractive powers. The fifth lens unit L5 is a final lens unit. The first lens unit L1 and the fifth lens unit L5 are a focus lens unit and an imaging lens unit, respectively. The second to fourth lens units L2 to L4 are zooming lens units that are moved during zooming. During zooming, the fourth lens unit L4 is moved non-linearly on the optical axis in association with movements of the second lens unit L2 and the third lens unit L3, and corrects the image plane fluctuation during zooming. The first lens unit L1 and the fifth lens unit L5 are fixed during (are not moved for) zooming. The diaphragm SP is included in the fourth lens unit L4 and closest to the object in the fourth lens unit L4.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (are not moved for) focusing. The second subunit L12 is moved to the object side during focusing from the infinity object to the short-distance object. The first subunit L11 corresponds to first to sixth surfaces, the second subunit L12 corresponds to seventh to ninth surfaces, and the third subunit L13 corresponds to tenth to sixteenth surfaces.

The zoom lens according to Example 8 includes, in order from the object side to the image side, first to fifth lens units L1 to L5 having positive, negative, positive, positive, and positive refractive powers. The fifth lens unit L5 is a final lens unit. The first lens unit L1 and the fifth lens unit L5 are a focus lens unit and an imaging lens unit, respectively. The second to fourth lens units L2 to L4 are zooming lens units that are moved during zooming. During zooming, the fourth lens unit L4 is moved non-linearly on the optical axis in association with movements of the second lens unit L2 and the third lens unit L3, and corrects the image plane fluctuation during zooming. The first lens unit L1 and the fifth lens unit L5 are fixed during (are not moved for) zooming. The diaphragm SP is included in the fourth lens unit L4 and closest to the object in the fourth lens unit L4.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (are not moved for) focusing. The second subunit L12 is moved to the object side during focusing from the infinity object to the short-distance object. The first subunit L11 corresponds to first to fourth surfaces, the second subunit L12 corresponds to fifth to seventh surfaces, and the third subunit L13 corresponds to eighth to fourteenth surfaces.

The zoom lens according to Example 9 includes, in order from the object side to the image side, first to fifth lens units L1 to L5 having positive, negative, negative, positive, and positive refractive powers. The fifth lens unit L5 is a final lens unit. The first lens unit L1 and the fifth lens unit L5 are a focus lens unit and an imaging lens unit, respectively. The second to fourth lens units L2 to L4 are zooming lens units that are moved during zooming. During zooming, the fourth lens unit L4 is moved non-linearly on the optical axis in association with movements of the second lens unit L2 and the third lens unit L3, and corrects the image plane fluctuation during zooming. The first lens unit L1 and the fifth lens unit L5 are fixed during (are not moved for) zooming. The diaphragm SP is included in the third lens unit L3 and closest to the object in the third lens unit L3.

The first lens unit L1 includes, in order from the object side to the image side, a first subunit L11 having a negative refractive power, a second subunit L12 having a negative refractive power, and a third subunit L13 having a positive refractive power. In this example, the third subunit L13 is a subsequent subunit L1R. The first subunit L11 and the third subunit L13 are fixed during (are not moved for) focusing. The second subunit L12 is moved to the object side during focusing from the infinity object to the short-distance object. The first subunit L11 corresponds to first to fourth surfaces, the second subunit L12 corresponds to fifth to seventh surfaces, and the third subunit L13 corresponds to eighth to fourteenth surfaces.

Numerical examples 1 to 9 corresponding to Examples 1 to 9 will be illustrated below.

In the surface data in each numerical example, r represents a radius of curvature of each optical surface, and d (mm) represents an on-axis distance (distance on the optical axis) between an m-th surface and an (m+1)-th surface, where m is the number of a surface counted from the light incident side. nd represents a refractive index of each optical element for the d-line, and vd represents an Abbe number of an optical element. The Abbe number vd of a certain material is expressed as follows:

$$vd = (Nd-1)/(NF-NC)$$

where Nd, NF, and NC are refractive indexes for the d-line (587.6 nm), F-line (486.1 nm), and C-line (656.3 nm) in the Fraunhofer lines.

In each numerical example, all values of d, a focal length (mm), an F-number, and a half angle of view (°) are set when the zoom lens according to each example focuses on the infinity object. A "backfocus" is a distance on the optical axis from the final lens surface (the lens surface closest to the image plane) to the paraxial image plane and is converted into an air equivalent length. An "overall lens length" is a length obtained by adding the backfocus to the distance on the optical axis from the frontmost surface (lens surface closest to the object) to the final surface of the zoom lens. The "lens unit" may be one or more lenses.

If the optical surface is an aspherical surface, an asterisk * is attached to the right side of the surface number. The aspherical shape is expressed as follows:

$$x = (h^2/R)/[1+\{1-(1+k)(h/R)^2\}^{1/2} + A4 \times h^4 + A6 \times h^6 + A8 \times h^8 + A10 \times h^{10} + A12 \times h^{12} + A14 \times h^{14} + A16 \times h^{16} + A3 \times h^3 + A5 \times h^5 + A7 \times h^7 + A9 \times h^{10} + A11 \times h^{11} + A13 \times h^{13} A15 \times h^{15}$$

where x is a displacement amount from a surface apex in the optical axis direction, h is a height from the optical axis in a direction orthogonal to the optical axis, R is a paraxial radius of curvature, k is a conical constant, and A3 to A16 are aspheric coefficients of each order. In addition, "e±XX" in each aspherical coefficient means "$\times 10^{\pm XX}$."

Numerical Example 1

UNIT: mm

SURFACE DATA

| Surface No. | r | d | nd | vd |
|---|---|---|---|---|
| 1 | 693.573 | 6.56 | 1.67270 | 32.1 |
| 2 | −297.435 | 0.20 | | |
| 3 | 1163.126 | 3.00 | 1.88300 | 40.8 |
| 4 | 130.288 | 27.54 | | |
| 5 | −107.539 | 2.40 | 1.88300 | 40.8 |
| 6 | 394.981 | 2.81 | 1.85478 | 24.8 |
| 7 | 11811.791 | 2.37 | | |
| 8 | −1910.285 | 7.79 | 1.67790 | 55.3 |
| 9 | −98.960 | 0.30 | | |
| 10 | 216.229 | 2.50 | 1.84666 | 23.8 |
| 11 | 96.083 | 10.84 | 1.59522 | 67.7 |
| 12 | −262.024 | 0.20 | | |
| 13 | 78.107 | 7.70 | 1.76385 | 48.5 |
| 14 | 277.456 | (Variable) | | |
| 15 | 193.297 | 1.50 | 1.76385 | 48.5 |
| 16 | 50.331 | 3.88 | | |
| 17 | 424.966 | 1.50 | 1.53775 | 74.7 |
| 18 | 40.836 | 6.85 | 1.85478 | 24.8 |
| 19 | 136.366 | 3.39 | | |
| 20 | −95.874 | 1.50 | 1.88300 | 40.8 |
| 21 | 365.144 | (Variable) | | |
| 22 | −68.978 | 4.43 | 1.89286 | 20.4 |
| 23 | −34.985 | 1.50 | 1.80100 | 35.0 |
| 24 | 274.566 | (Variable) | | |
| 25 (Diaphragm) | ∞ | 1.35 | | |
| 26* | 272.940 | 6.72 | 1.76385 | 48.5 |
| 27 | −104.186 | 0.20 | | |

-continued

UNIT: mm

| | | | | |
|---|---|---|---|---|
| 28 | 63.581 | 11.23 | 1.81600 | 46.6 |
| 29 | −86.726 | 1.50 | 1.78880 | 28.4 |
| 30 | 106.947 | (Variable) | | |
| 31 | −1058.507 | 1.50 | 1.89286 | 20.4 |
| 32 | 51.139 | 8.29 | 1.43875 | 94.9 |
| 33 | −191.534 | 0.20 | | |
| 34 | 188.080 | 6.25 | 1.90525 | 35.0 |
| 35 | −180.464 | 0.20 | | |
| 36 | 54.179 | 12.80 | 1.89286 | 20.4 |
| 37 | −68.790 | 1.30 | 1.79952 | 42.2 |
| 38 | −2577.667 | 2.58 | | |
| 39 | 833.119 | 1.30 | 1.85478 | 24.8 |
| 40 | 23.000 | 8.76 | 1.81600 | 46.6 |
| 41 | 37.205 | 2.50 | | |
| 42 | 65.563 | 8.59 | 1.81600 | 46.6 |
| 43 | −43.421 | 1.30 | 1.85478 | 24.8 |
| 44 | −246.393 | 39.00 | | |
| Image Plane | ∞ | | | |

ASPHERIC DATA

26th Surface

K = 0.00000e+000  A 4 = −1.13870e−006  A 6 = 8.24584e−011
A 8 = −1.78933e−013

VARIOUS DATA
ZOOM RATIO 2.88

| | WIDE-ANGLE | MIDDLE | TELEPHOTO |
|---|---|---|---|
| Focal Length: | 31.20 | 70.00 | 89.85 |
| Fno: | 1.51 | 1.51 | 1.51 |
| Half Angle of View (°): | 25.38 | 11.94 | 9.35 |
| Overall lens length: | 284.23 | 284.23 | 284.23 |
| BF: | 39.00 | 39.00 | 39.00 |
| d14 | 1.00 | 45.16 | 55.23 |
| d21 | 26.79 | 4.40 | 4.92 |
| d24 | 10.10 | 6.21 | 1.50 |
| d30 | 32.01 | 14.13 | 8.26 |

ZOOM LENS UNIT DATA

| Lens Unit | Starting Surface | Focal Length |
|---|---|---|
| 1 | 1 | 112.68 |
| 2 | 15 | −47.66 |
| 3 | 22 | −75.21 |
| 4 | 25 | 59.07 |
| 5 | 31 | 61.71 |

Numerical Example 2

UNIT: mm

SURFACE DATA

| Surface No. | r | d | nd | vd |
|---|---|---|---|---|
| 1 | 616.916 | 5.26 | 1.67270 | 32.1 |
| 2 | −611.974 | 0.20 | | |
| 3 | 902.990 | 3.00 | 1.88300 | 40.8 |
| 4 | 77.552 | 28.50 | | |
| 5 | −114.060 | 2.40 | 1.88300 | 40.8 |
| 6 | −2333.301 | 3.85 | 1.85478 | 24.8 |
| 7 | −1217.691 | 1.99 | | |
| 8 | 496.893 | 10.82 | 1.67790 | 55.3 |
| 9 | −121.983 | 0.30 | | |
| 10 | 159.534 | 2.50 | 1.84666 | 23.8 |
| 11 | 83.439 | 14.72 | 1.59522 | 67.7 |
| 12 | −347.942 | 0.20 | | |
| 13* | 79.631 | 12.48 | 1.76385 | 48.5 |
| 14 | −5902.728 | (Variable) | | |
| 15* | 152.792 | 1.50 | 1.76385 | 48.5 |
| 16 | 28.620 | 9.43 | | |
| 17 | −129.690 | 1.50 | 1.59522 | 67.7 |
| 18 | 37.771 | 8.20 | 1.84666 | 23.8 |
| 19 | −1590.048 | 5.58 | | |
| 20 | −30.852 | 1.50 | 1.89190 | 37.1 |
| 21 | −60.293 | (Variable) | | |
| 22 (Diaphragm) | ∞ | (Variable) | | |
| 23* | −500.000 | 3.27 | 1.76385 | 48.5 |
| 24 | −251.685 | 0.20 | | |
| 25 | 113.225 | 7.31 | 1.81600 | 46.6 |
| 26 | −175.174 | 1.50 | 1.84666 | 23.8 |
| 27 | −276.027 | (Variable) | | |
| 28 | 133.274 | 1.50 | 1.95906 | 17.5 |
| 29 | 41.926 | 10.03 | 1.43875 | 94.9 |
| 30 | −202.725 | 0.19 | | |
| 31 | 2390.124 | 1.81 | 2.00100 | 29.1 |
| 32 | −593.662 | 0.20 | | |
| 33 | 50.542 | 10.22 | 1.89286 | 20.4 |
| 34 | −112.105 | 1.30 | 1.75500 | 52.3 |
| 35 | −1072.603 | 7.60 | | |
| 36 | 261.912 | 1.30 | 1.84666 | 23.8 |
| 37 | 24.084 | 5.05 | 1.75500 | 52.3 |
| 38 | 35.090 | 2.92 | | |
| 39 | 69.779 | 9.63 | 1.88300 | 40.8 |
| 40 | −35.412 | 1.30 | 1.84666 | 23.8 |
| 41 | −246.393 | 39.00 | | |
| Image Plane | ∞ | | | |

ASPHERIC DATA

13rd Surface

K = 0.00000e+000  A 4 = −8.18901e−008  A 6 = −1.90678e−011
A 8 = 1.42909e−015

15th Surface

K = 0.00000e+000  A 4 = 2.01415e−006  A 6 = −1.21880e−009
A 8 = 1.66437e−012

23rd Surface

K = 0.00000e+000  A 4 = −1.06285e−006  A 6 = 8.18942e−010
A 8 = −8.94142e−013

VARIOUS DATA
ZOOM RATIO 3.84

| | WIDE-ANGLE | MIDDLE | TELEPHOTO |
|---|---|---|---|
| Focal Length: | 21.00 | 65.01 | 80.57 |
| Fno: | 1.51 | 1.51 | 1.51 |
| Half Angle of View (°): | 35.17 | 12.82 | 10.41 |
| Overall lens length: | 288.03 | 288.03 | 288.03 |
| BF: | 39.00 | 39.00 | 39.00 |
| d14 | 0.95 | 49.84 | 54.23 |
| d21 | 12.57 | 2.33 | 3.46 |
| d22 | 25.12 | 14.22 | 5.69 |
| d27 | 31.13 | 3.38 | 6.38 |

ZOOM LENS UNIT DATA

| Lens Unit | Starting Surface | Focal Length |
|---|---|---|
| 1 | 1 | 78.30 |
| 2 | 15 | −26.68 |
| 3 | 22 | ∞ |
| 4 | 23 | 86.45 |
| 5 | 28 | 65.47 |

Numerical Example 3

UNIT: mm

SURFACE DATA

| Surface No. | r | d | nd | vd |
|---|---|---|---|---|
| 1* | 154.993 | 2.00 | 1.75500 | 52.3 |
| 2 | 54.960 | 12.17 | | |
| 3 | 221.969 | 3.00 | 1.64000 | 60.1 |
| 4 | 87.675 | 8.70 | | |
| 5 | 3110.287 | 1.50 | 1.75500 | 52.3 |
| 6 | 166.565 | 18.52 | | |
| 7 | −103.457 | 2.40 | 1.88300 | 40.8 |
| 8 | 637.276 | 6.24 | 1.85478 | 24.8 |
| 9 | −202.125 | 5.29 | | |
| 10* | 201.625 | 15.46 | 1.67790 | 55.3 |
| 11 | −97.682 | 0.30 | | |
| 12 | 178.136 | 2.50 | 1.85478 | 24.8 |
| 13 | 68.147 | 16.24 | 1.59522 | 67.7 |
| 14 | −300.692 | 0.20 | | |
| 15 | 108.984 | 5.82 | 1.76385 | 48.5 |
| 16 | 386.481 | (Variable) | | |
| 17 | 78.757 | 1.50 | 1.76385 | 48.5 |
| 18 | 43.661 | 6.19 | | |
| 19 | 610.945 | 1.50 | 1.53775 | 74.7 |
| 20 | 42.760 | 5.99 | 1.84666 | 23.8 |
| 21 | 79.210 | 13.38 | | |
| 22 | −56.463 | 1.50 | 1.88300 | 40.8 |
| 23 | −114.050 | (Variable) | | |
| 24 | −92.895 | 2.18 | 1.89286 | 20.4 |
| 25 | −62.900 | 1.50 | 1.80100 | 35.0 |
| 26 | −3507.300 | (Variable) | | |
| 27 (Diaphragm) | ∞ | 0.99 | | |
| 28* | 1792.855 | 2.54 | 1.76385 | 48.5 |
| 29 | −146.735 | 0.20 | | |
| 30 | 63.401 | 5.27 | 1.81600 | 46.6 |
| 31 | 124.169 | 1.50 | 1.78880 | 28.4 |
| 32 | 219.651 | (Variable) | | |
| 33 | 1503.266 | 1.50 | 1.89286 | 20.4 |
| 34 | 49.601 | 8.82 | 1.43875 | 94.9 |
| 35 | −150.004 | 0.20 | | |
| 36 | 127.113 | 4.15 | 1.90525 | 35.0 |
| 37 | −352.747 | 4.48 | | |
| 38 | 61.348 | 9.35 | 1.89286 | 20.4 |
| 39 | −77.368 | 1.30 | 1.79952 | 42.2 |
| 40 | −247.553 | 2.70 | | |
| 41 | 2085.046 | 1.30 | 1.85478 | 24.8 |
| 42 | 27.003 | 3.43 | 1.81600 | 46.6 |
| 43 | 34.999 | 2.58 | | |
| 44 | 59.944 | 13.35 | 1.81600 | 46.6 |
| 45 | −26.611 | 1.30 | 1.85478 | 24.8 |
| 46 | −246.393 | 39.00 | | |
| Image Plane | ∞ | | | |

ASPHERIC DATA

1st Surface

K = 0.00000e+000 A 4 = 3.99591e−009 A 6 = 5.12355e−011
A 8 = −1.64561e−014

10th Surface

K = 0.00000e+000 A 4 = −1.06083e−008 A 6 = −1.40632e−011
A 8 = 3.32660e−015

28th Surface

K = 0.00000e+000 A 4 = −1.54169e−006 A 6 = 1.56757e−010
A 8 = −9.78365e−013

VARIOUS DATA
ZOOM RATIO 2.50

| | WIDE-ANGLE | MIDDLE | TELEPHOTO |
|---|---|---|---|
| Focal Length: | 18.01 | 38.01 | 45.01 |
| Fno: | 1.51 | 1.51 | 1.51 |
| Half Angle of View (°): | 39.42 | 21.27 | 18.20 |

UNIT: mm

| | | | |
|---|---|---|---|
| Overall lens length: | 308.88 | 308.88 | 308.88 |
| BF: | 39.00 | 39.00 | 39.00 |
| d16 | 1.01 | 53.06 | 62.37 |
| d23 | 44.60 | 5.77 | 1.96 |
| d26 | 0.16 | 3.42 | 1.46 |
| d32 | 25.10 | 8.62 | 5.09 |

ZOOM LENS UNIT DATA

| Lens Unit | Starting Surface | Focal Length |
|---|---|---|
| 1 | 1 | 83.19 |
| 2 | 17 | −51.26 |
| 3 | 24 | −126.05 |
| 4 | 27 | 66.59 |
| 5 | 33 | 61.22 |

Numerical Example 4

UNIT: mm

SURFACE DATA

| Surface No. | r | d | nd | vd |
|---|---|---|---|---|
| 1 | 1125.145 | 3.00 | 1.88300 | 40.8 |
| 2 | 298.167 | 7.39 | | |
| 3 | −277.896 | 4.87 | 1.68893 | 31.1 |
| 4 | −161.588 | 29.56 | | |
| 5 | −157.178 | 2.40 | 1.88300 | 40.8 |
| 6 | 206.924 | 3.84 | 1.85478 | 24.8 |
| 7 | 887.076 | 2.00 | | |
| 8 | 382.890 | 7.21 | 1.67790 | 55.3 |
| 9 | −166.825 | 0.30 | | |
| 10 | 255.276 | 2.50 | 1.85478 | 24.8 |
| 11 | 83.685 | 11.88 | 1.59522 | 67.7 |
| 12 | −360.190 | 0.20 | | |
| 13* | 81.474 | 8.42 | 1.76385 | 48.5 |
| 14 | 427.449 | (Variable) | | |
| 15 | 1195.640 | 1.50 | 1.76385 | 48.5 |
| 16 | 48.644 | 6.81 | | |
| 17 | −122.706 | 1.50 | 1.53775 | 74.7 |
| 18 | 54.160 | 5.64 | 1.84666 | 23.8 |
| 19 | 630.720 | 4.07 | | |
| 20 | −70.435 | 1.50 | 1.88300 | 40.8 |
| 21 | −159.956 | (Variable) | | |
| 22 | −87.166 | 3.88 | 1.89286 | 20.4 |
| 23 | −48.815 | 1.50 | 1.74951 | 35.3 |
| 24 | 800.734 | (Variable) | | |
| 25* | 165.464 | 6.49 | 1.76385 | 48.5 |
| 26 | −110.252 | 0.20 | | |
| 27 | 46.711 | 14.83 | 1.81600 | 46.6 |
| 28 | −133.356 | 1.50 | 1.77047 | 29.7 |
| 29 | 42.874 | (Variable) | | |
| 30 (Diaphragm) | ∞ | 1.00 | | |
| 31 | 171.168 | 1.50 | 1.85896 | 22.7 |
| 32 | 38.347 | 9.10 | 1.43875 | 94.9 |
| 33 | 2254.890 | 0.20 | | |
| 34 | 97.675 | 6.51 | 1.90525 | 35.0 |
| 35 | −648.462 | 4.65 | | |
| 36 | 52.968 | 10.86 | 1.89286 | 20.4 |
| 37 | −66.383 | 1.30 | 1.79952 | 42.2 |
| 38 | −316.352 | 0.31 | | |
| 39 | 559.860 | 1.30 | 1.85478 | 24.8 |
| 40 | 23.000 | 6.92 | 1.81600 | 46.6 |
| 41 | 35.000 | 4.79 | | |
| 42 | 93.866 | 6.65 | 1.81600 | 46.6 |
| 43 | −36.403 | 1.30 | 1.85478 | 24.8 |
| 44 | −246.393 | 39.62 | | |
| Image Plane | ∞ | | | |

-continued

UNIT: mm

ASPHERIC DATA

13rd Surface

K = 0.00000e+000 A 4 = 2.42678e−009 A 6 = 6.30738e−012
A 8 = −1.54807e−015

25th Surface

K = 0.00000e+000 A 4 = −1.02688e−006 A 6 = 4.84075e−011
A 8 = −8.15923e−014

VARIOUS DATA
ZOOM RATIO 2.50

| | WIDE-ANGLE | MIDDLE | TELEPHOTO |
|---|---|---|---|
| Focal Length: | 40.00 | 85.00 | 99.97 |
| Fno: | 1.51 | 1.51 | 1.51 |
| Half Angle of View (°): | 20.31 | 9.88 | 8.42 |
| Overall lens length: | 282.55 | 282.55 | 282.55 |
| BF: | 39.62 | 39.62 | 39.62 |
| d14 | 1.30 | 35.97 | 41.30 |
| d21 | 19.22 | 2.80 | 2.80 |
| d24 | 13.40 | 6.75 | 2.50 |
| d29 | 19.62 | 8.02 | 6.95 |

ZOOM LENS UNIT DATA

| Lens Unit | Starting Surface | Focal Length |
|---|---|---|
| 1 | 1 | 104.32 |
| 2 | 15 | −42.52 |
| 3 | 22 | −121.65 |
| 4 | 25 | 63.04 |
| 5 | 30 | 64.54 |

Numerical Example 5

UNIT: mm

SURFACE DATA

| Surface No. | r | d | nd | vd |
|---|---|---|---|---|
| 1 | 328.416 | 8.46 | 1.67270 | 32.1 |
| 2 | −307.585 | 0.20 | | |
| 3 | −1228.688 | 3.00 | 1.88300 | 40.8 |
| 4 | 139.714 | 23.57 | | |
| 5 | −104.740 | 2.40 | 1.88300 | 40.8 |
| 6 | 174.908 | 4.78 | 1.85478 | 24.8 |
| 7 | 1279.113 | 2.00 | | |
| 8 | 543.940 | 9.20 | 1.69680 | 55.5 |
| 9 | −110.112 | 0.30 | | |
| 10 | 210.234 | 2.50 | 1.85478 | 24.8 |
| 11 | 79.096 | 12.99 | 1.59522 | 67.7 |
| 12 | −233.372 | 4.75 | | |
| 13 | 84.201 | 8.19 | 1.76385 | 48.5 |
| 14 | 540.356 | (Variable) | | |
| 15 | 335.498 | 1.50 | 1.76385 | 48.5 |
| 16 | 45.199 | (Variable) | | |
| 17 | 251.321 | 1.50 | 1.53775 | 74.7 |
| 18 | 31.422 | 5.80 | 1.85478 | 24.8 |
| 19 | 81.658 | 5.27 | | |
| 20 | −61.658 | 1.50 | 1.88300 | 40.8 |
| 21 | −128.716 | (Variable) | | |
| 22 | −99.969 | 2.83 | 1.89286 | 20.4 |
| 23 | −54.965 | 1.50 | 1.80100 | 35.0 |
| 24 | 173.675 | (Variable) | | |
| 25 (Diaphragm) | ∞ | 3.41 | | |
| 26* | 235.337 | 4.61 | 1.76385 | 48.5 |
| 27 | −113.674 | 0.20 | | |
| 28 | 54.577 | 6.88 | 1.81600 | 46.6 |
| 29 | −788.583 | 1.50 | 1.78880 | 28.4 |
| 30 | 75.050 | (Variable) | | |
| 31 | −662.556 | 1.50 | 1.89286 | 20.4 |
| 32 | 53.238 | 8.93 | 1.43875 | 94.9 |
| 33 | −115.345 | 0.20 | | |
| 34 | 128.222 | 6.50 | 1.90525 | 35.0 |
| 35 | −248.127 | 0.20 | | |
| 36 | 51.842 | 10.18 | 1.89286 | 20.4 |
| 37 | −83.149 | 1.30 | 1.79952 | 42.2 |
| 38 | −754.752 | 2.01 | | |
| 39 | −742.792 | 1.30 | 1.85478 | 24.8 |
| 40 | 23.000 | 8.74 | 1.81600 | 46.6 |
| 41 | 37.094 | 3.06 | | |
| 42 | 78.512 | 7.08 | 1.81600 | 46.6 |
| 43 | −54.162 | 1.30 | 1.85478 | 24.8 |
| 44 | −246.393 | 39.30 | | |
| Image Plane | ∞ | | | |

ASPHERIC DATA

26th Surface

K = 0.00000e+000 A 4 = −9.99589e−007 A 6 = −3.30011e−010
A 8 = 2.67589e−013

VARIOUS DATA
ZOOM RATIO 2.88

| | WIDE-ANGLE | MIDDLE | TELEPHOTO |
|---|---|---|---|
| Focal Length: | 31.20 | 70.00 | 89.85 |
| Fno: | 1.51 | 1.51 | 1.51 |
| Half Angle of View (°): | 25.38 | 11.94 | 9.35 |
| Overall lens length: | 288.80 | 288.80 | 288.80 |
| BF: | 39.30 | 38.02 | 37.43 |
| d14 | 0.99 | 42.24 | 51.07 |
| d16 | 11.63 | 4.84 | 5.74 |
| d21 | 16.17 | 2.12 | 1.90 |
| d24 | 12.76 | 6.90 | 1.48 |
| d30 | 36.80 | 23.53 | 20.02 |
| d44 | 39.30 | 38.02 | 37.43 |

ZOOM LENS UNIT DATA

| Lens Unit | Starting Surface | Focal Length |
|---|---|---|
| 1 | 1 | 103.52 |
| 2 | 15 | −68.21 |
| 3 | 17 | −209.92 |
| 4 | 22 | −83.44 |
| 5 | 25 | 64.17 |
| 6 | 31 | 61.08 |

Numerical Example 6

UNIT: mm

SURFACE DATA

| Surface No. | r | d | nd | vd |
|---|---|---|---|---|
| 1 | 4029.834 | 5.15 | 1.51633 | 64.1 |
| 2 | −385.010 | 0.20 | | |
| 3 | 1020.499 | 3.00 | 1.65160 | 58.5 |
| 4 | 128.034 | 30.08 | | |
| 5 | −132.222 | 2.40 | 1.61340 | 44.3 |
| 6 | 101.910 | 5.59 | 1.84666 | 23.8 |
| 7 | 240.074 | 2.45 | | |
| 8* | 430.739 | 6.94 | 1.60311 | 60.6 |
| 9 | −170.604 | 0.30 | | |
| 10 | 167.508 | 2.50 | 1.84666 | 23.8 |
| 11 | 82.157 | 13.08 | 1.43875 | 94.9 |
| 12 | −155.312 | 0.20 | | |
| 13 | 76.756 | 8.95 | 1.70300 | 52.4 |

-continued

UNIT: mm

| | | | | |
|---|---|---|---|---|
| 14 | 547.699 | (Variable) | | |
| 15 | 148.740 | 1.50 | 1.59522 | 67.7 |
| 16 | 32.787 | 8.13 | | |
| 17 | −163.643 | 1.50 | 1.57099 | 50.8 |
| 18 | 37.352 | 5.54 | 2.00100 | 29.1 |
| 19 | 218.366 | 3.37 | | |
| 20 | −79.877 | 1.50 | 1.90525 | 35.0 |
| 21 | −402.317 | (Variable) | | |
| 22 | −66.390 | 1.50 | 1.59522 | 67.7 |
| 23 | 398.462 | (Variable) | | |
| 24 (Diaphragm) | ∞ | 1.31 | | |
| 25 | 86.320 | 4.97 | 1.88300 | 40.8 |
| 26* | −205.716 | (Variable) | | |
| 27 | 50.692 | 10.51 | 1.59410 | 60.5 |
| 28 | −53.238 | 1.50 | 1.77047 | 29.7 |
| 29 | 48.329 | 9.44 | | |
| 30 | 64.623 | 6.20 | 2.05090 | 26.9 |
| 31 | −217.688 | 0.20 | | |
| 32 | 65.531 | 1.10 | 1.85478 | 24.8 |
| 33 | 28.153 | 10.56 | 1.43875 | 94.7 |
| 34 | −214.930 | 0.20 | | |
| 35 | 97.225 | 5.81 | 1.89286 | 20.4 |
| 36 | −109.967 | 1.10 | 1.95375 | 32.3 |
| 37 | 34.580 | 3.65 | | |
| 38 | 37.676 | 6.98 | 1.51633 | 64.1 |
| 39 | 744.601 | 62.06 | | |
| Image Plane | ∞ | | | |

ASPHERIC DATA

8th Surface $K = 0.00000e+000$ $A\,4 = -2.31283e-008$ $A\,6 = 3.95673e-012$
$A\,8 = -1.09447e-015$ 26th Surface $K = 0.00000e+000$ $A\,4 = 1.21365e-006$ $A\,6 = -2.16657e-011$
$A\,8 = -2.45189e-013$

VARIOUS DATA
ZOOM RATIO 2.88

| | WIDE-ANGLE | MIDDLE | TELEPHOTO |
|---|---|---|---|
| Focal Length: | 45.00 | 103.95 | 129.60 |
| Fno: | 2.25 | 2.24 | 2.25 |
| Half Angle of View (°): | 25.68 | 11.76 | 9.48 |
| Overall lens length: | 289.00 | 289.00 | 289.00 |
| BF: | 62.06 | 62.06 | 62.06 |
| d14 | 1.00 | 43.38 | 51.17 |
| d21 | 24.97 | 4.24 | 4.86 |
| d23 | 14.15 | 7.48 | 1.99 |
| d26 | 19.40 | 4.43 | 1.50 |

ZOOM LENS UNIT DATA

| Lens Unit | Starting Surface | Focal Length |
|---|---|---|
| 1 | 1 | 106.72 |
| 2 | 15 | −47.93 |
| 3 | 22 | −95.16 |
| 4 | 24 | 69.02 |
| 5 | 27 | 91.35 |

Numerical Example 7

UNIT: mm

SURFACE DATA

| Surface No. | r | d | nd | vd |
|---|---|---|---|---|
| 1 | 183.235 | 2.50 | 1.84850 | 43.8 |
| 2 | 52.323 | 25.17 | | |
| 3 | −152.609 | 2.50 | 1.69560 | 59.0 |
| 4 | 1412.556 | 0.12 | | |
| 5 | 95.149 | 6.81 | 1.85896 | 22.7 |
| 6 | 361.124 | 18.05 | | |
| 7 | −186.582 | 2.40 | 1.61340 | 44.3 |
| 8 | 745.577 | 3.56 | 1.84666 | 23.8 |
| 9 | 2468.566 | 1.00 | | |
| 10* | 168.444 | 7.45 | 1.60311 | 60.6 |
| 11 | −211.336 | 0.30 | | |
| 12 | 136.224 | 2.50 | 1.84666 | 23.8 |
| 13 | 62.581 | 18.91 | 1.43875 | 94.9 |
| 14 | −94.739 | 0.20 | | |
| 15 | 76.622 | 6.91 | 1.70300 | 52.4 |
| 16 | 324.409 | (Variable) | | |
| 17* | 105.978 | 2.00 | 1.90366 | 31.3 |
| 18 | 27.249 | 7.91 | | |
| 19 | −49.274 | 1.01 | 1.59410 | 60.5 |
| 20 | 37.479 | 7.00 | 1.95375 | 32.3 |
| 21 | −121.845 | 0.34 | | |
| 22 | −223.695 | 1.78 | 1.85025 | 30.1 |
| 23 | −100.810 | 3.56 | | |
| 24 | −33.771 | 1.00 | 1.69560 | 59.0 |
| 25 | −76.287 | (Variable) | | |
| 26 | −78.222 | 1.00 | 1.95375 | 32.3 |
| 27 | 99.123 | 3.57 | 1.89286 | 20.4 |
| 28 | −294.460 | (Variable) | | |
| 29(Diaphragm) | ∞ | 1.00 | | |
| 30* | 76.964 | 3.59 | 1.95375 | 32.3 |
| 31 | 4726.149 | 0.12 | | |
| 32 | 43.651 | 4.99 | 1.55032 | 75.5 |
| 33 | 175.192 | 1.00 | 1.88300 | 40.7 |
| 34 | 71.494 | (Variable) | | |
| 35 | 47.401 | 5.97 | 1.48749 | 70.2 |
| 36 | −443.615 | 0.12 | | |
| 37 | 41.689 | 9.92 | 1.43875 | 94.7 |
| 38 | −184.574 | 0.50 | | |
| 39 | 41.343 | 1.00 | 1.95375 | 32.3 |
| 40 | 17.821 | 11.26 | 1.53172 | 48.8 |
| 41 | 189.712 | 1.89 | | |
| 42 | −73.210 | 4.06 | 1.59522 | 67.7 |
| 43 | −20.366 | 1.00 | 1.96300 | 24.1 |
| 44 | 51.282 | 7.91 | | |
| 45 | 154.702 | 5.25 | 1.89286 | 20.4 |
| 46 | −48.599 | 48.92 | | |
| Image Plane | ∞ | | | |

ASPHERIC DATA

10th Surface $K = 0.00000e+000$ $A\,4 = -2.53004e-007$ $A\,6 = 5.98970e-011$
$A\,8 = -1.25485e-014$ 17th Surface $K = 0.00000e+000$ $A\,4 = 2.24213e-006$ $A\,6 = -3.64547e-010$
$A\,8 = 1.83794e-012$ 30th Surface $K = 0.00000e+000$ $A\,4 = -1.61666e-006$ $A\,6 = 3.08898e-011$
$A\,8 = -5.53302e-013$

VARIOUS DATA
ZOOM RATIO 3.57

| | WIDE-ANGLE | MIDDLE | TELEPHOTO |
|---|---|---|---|
| Focal Length: | 28.00 | 80.00 | 100.00 |
| Fno: | 2.50 | 2.50 | 2.50 |
| Half Angle of View (°): | 37.69 | 15.13 | 12.21 |

-continued

UNIT: mm

| | | | |
|---|---|---|---|
| Overall lens length: | 293.58 | 293.58 | 293.58 |
| BF: | 48.92 | 48.92 | 48.92 |
| d16 | 1.17 | 44.67 | 50.94 |
| d25 | 30.74 | 1.00 | 4.10 |
| d28 | 11.29 | 7.11 | 0.99 |
| d34 | 14.33 | 4.76 | 1.50 |

ZOOM LENS UNIT DATA

| Lens Unit | Starting Surface | Focal Length |
|---|---|---|
| 1 | 1 | 67.07 |
| 2 | 17 | −38.33 |
| 3 | 26 | −103.03 |
| 4 | 29 | 65.02 |
| 5 | 35 | 93.42 |

Numerical Example 8

UNIT: mm

SURFACE DATA

| Surface No. | r | d | nd | vd |
|---|---|---|---|---|
| 1 | 345.108 | 6.56 | 1.67270 | 32.1 |
| 2 | −302.313 | 1.15 | | |
| 3 | 4168.195 | 3.00 | 1.88300 | 40.8 |
| 4 | 166.642 | 33.02 | | |
| 5 | −113.636 | 2.40 | 1.88300 | 40.8 |
| 6 | 180.296 | 5.87 | 1.85478 | 24.8 |
| 7 | −592.171 | 0.99 | | |
| 8 | 10229.264 | 6.87 | 1.67790 | 55.3 |
| 9 | −122.470 | 0.20 | | |
| 10 | 351.085 | 2.50 | 1.84666 | 23.8 |
| 11 | 81.821 | 11.61 | 1.59522 | 67.7 |
| 12 | −437.572 | 0.19 | | |
| 13 | 83.687 | 7.66 | 1.76385 | 48.5 |
| 14 | 309.486 | (Variable) | | |
| 15 | 112.651 | 5.24 | 1.71736 | 29.5 |
| 16 | −137.792 | 0.91 | 1.43700 | 95.1 |
| 17 | 136.937 | 2.29 | | |
| 18 | −1533.471 | 0.81 | 1.80400 | 46.5 |
| 19 | 32.466 | 4.61 | 1.80518 | 25.5 |
| 20 | 67.289 | 6.04 | | |
| 21 | −69.664 | 1.00 | 1.90043 | 37.4 |
| 22 | 248.613 | (Variable) | | |
| 23 | 344.398 | 3.71 | 1.84850 | 43.8 |
| 24 | −131.448 | 0.12 | | |
| 25 | −871.049 | 3.75 | 1.53775 | 74.7 |
| 26 | −102.320 | 1.31 | 1.84666 | 23.8 |
| 27 | −309.425 | (Variable) | | |
| 28 (Diaphragm) | ∞ | 0.20 | | |
| 29 | 412.844 | 3.01 | 1.56883 | 56.0 |
| 30 | −307.157 | 0.12 | | |
| 31 | 48.293 | 12.01 | 1.53775 | 74.7 |
| 32 | −55.411 | 0.80 | 1.90043 | 37.4 |
| 33 | 163.637 | (Variable) | | |
| 34 | 102.513 | 1.20 | 1.59282 | 68.6 |
| 35 | 76.694 | 7.40 | 1.59270 | 35.3 |
| 36 | −77.760 | 0.12 | | |
| 37 | 43.099 | 9.21 | 1.53775 | 74.7 |
| 38 | −3725.697 | 0.70 | 1.87070 | 40.7 |
| 39 | 35.950 | 5.37 | | |
| 40 | 97.786 | 4.82 | 1.51860 | 69.9 |
| 41 | −103.856 | 13.69 | | |
| 42 | −32.791 | 0.81 | 1.55032 | 75.5 |
| 43 | 145.479 | 2.50 | 1.84666 | 23.8 |
| 44 | −401.050 | 43.21 | | |
| Image Plane | ∞ | | | |

-continued

UNIT: mm

VARIOUS DATA
ZOOM RATIO 3.00

| | WIDE-ANGLE | MIDDLE | TELEPHOTO |
|---|---|---|---|
| Focal Length: | 70.00 | 170.00 | 210.00 |
| Fno: | 2.50 | 2.50 | 3.00 |
| Half Angle of View (°): | 17.17 | 7.25 | 5.88 |
| Overall lens length: | 299.00 | 299.00 | 299.00 |
| BF: | 43.21 | 43.21 | 43.21 |
| d14 | 0.99 | 54.52 | 61.90 |
| d22 | 43.31 | 14.21 | 1.73 |
| d27 | 19.85 | 1.50 | 7.44 |
| d33 | 17.89 | 11.82 | 10.98 |

ZOOM LENS UNIT DATA

| Lens Unit | Starting Surface | Focal Length |
|---|---|---|
| 1 | 1 | 144.05 |
| 2 | 15 | −43.52 |
| 3 | 23 | 125.05 |
| 4 | 28 | 274.74 |
| 5 | 34 | 155.58 |

Numerical Example 9

UNIT: mm

SURFACE DATA

| Surface No. | r | d | nd | vd |
|---|---|---|---|---|
| 1 | 144.013 | 14.68 | 1.68893 | 31.1 |
| 2 | −654.609 | 0.20 | | |
| 3 | 332.074 | 3.00 | 1.88300 | 40.8 |
| 4 | 87.465 | 30.02 | | |
| 5 | −93.121 | 2.40 | 1.88300 | 40.8 |
| 6 | 611.837 | 1.65 | 1.85478 | 24.8 |
| 7 | 1223.551 | 3.86 | | |
| 8* | −337.831 | 6.04 | 1.67790 | 55.3 |
| 9 | −86.977 | 0.30 | | |
| 10 | 644.044 | 2.50 | 1.84666 | 23.8 |
| 11 | 127.910 | 9.49 | 1.59522 | 67.7 |
| 12 | −135.094 | 0.20 | | |
| 13 | 69.484 | 7.55 | 1.76385 | 48.5 |
| 14 | 185.617 | (Variable) | | |
| 15 | 122.529 | 1.50 | 1.76385 | 48.5 |
| 16 | 78.275 | 2.96 | | |
| 17 | 4899.347 | 1.50 | 1.53775 | 74.7 |
| 18 | 35.984 | 6.88 | 1.84666 | 23.8 |
| 19 | 82.811 | 4.19 | | |
| 20 | −99.464 | 1.50 | 1.88300 | 40.8 |
| 21 | 142.804 | (Variable) | | |
| 22 (Diaphragm) | ∞ | 3.00 | | |
| 23 | −80.056 | 4.94 | 1.85896 | 22.7 |
| 24 | −35.171 | 1.50 | 1.80100 | 35.0 |
| 25 | 249.621 | (Variable) | | |
| 26* | 134.019 | 7.26 | 1.76385 | 48.5 |
| 27 | −83.838 | 0.20 | | |
| 28 | 64.113 | 12.28 | 1.81600 | 46.6 |
| 29 | −74.585 | 1.50 | 1.78880 | 28.4 |
| 30 | 67.589 | (Variable) | | |
| 31 | −445.951 | 1.50 | 1.89286 | 20.4 |
| 32 | 57.168 | 8.16 | 1.43875 | 94.9 |
| 33 | −132.292 | 0.20 | | |
| 34 | 104.661 | 4.32 | 2.00100 | 29.1 |
| 35 | −619.261 | 0.20 | | |
| 36 | 49.210 | 10.26 | 1.89286 | 20.4 |
| 37 | −88.916 | 1.30 | 1.79952 | 42.2 |
| 38 | −590.774 | 0.55 | | |
| 39 | −495.404 | 1.30 | 1.85478 | 24.8 |
| 40 | 23.014 | 6.77 | 1.81600 | 46.6 |

-continued

UNIT: mm

| 41 | 36.173 | 2.75 | | |
|---|---|---|---|---|
| 42 | 68.627 | 6.25 | 1.81600 | 46.6 |
| 43 | −79.753 | 1.30 | 1.85478 | 24.8 |
| 44 | −246.393 | 39.00 | | |
| Image Plane | ∞ | | | |

ASPHERIC DATA

8th Surface

K = 0.00000e+000 A 4 = 1.63015e−008 A 6 = 1.82004e−011
A 8 = −6.10670e−015

26th Surface

K = 0.00000e+000 A 4 = −1.15351e−006 A 6 = 1.34077e−010
A 8 = −7.01868e−016

VARIOUS DATA
ZOOM RATIO 2.00

| | WIDE-ANGLE | MIDDLE | TELEPHOTO |
|---|---|---|---|
| Focal Length: | 40.00 | 73.07 | 80.01 |
| Fno: | 1.40 | 1.40 | 1.40 |
| Half Angle of View (°): | 20.30 | 11.45 | 10.48 |
| Overall lens length: | 278.34 | 278.34 | 278.34 |
| BF: | 39.00 | 39.00 | 39.00 |
| d14 | 7.84 | 46.02 | 50.70 |
| d21 | 17.77 | 3.14 | 2.66 |
| d25 | 9.36 | 5.96 | 4.57 |
| d30 | 28.43 | 8.28 | 5.48 |

ZOOM LENS UNIT DATA

| Lens Unit | Starting Surface | Focal Length |
|---|---|---|
| 1 | 1 | 133.92 |
| 2 | 15 | −49.82 |
| 3 | 22 | −80.70 |
| 4 | 26 | 54.49 |
| 5 | 31 | 58.05 |

TABLE 1 summarizes various values in each numerical example below.

TABLE 1

| | Numerical Example | | | | | | | | |
|---|---|---|---|---|---|---|---|---|---|
| Inequality | 1 | 2 | 3 | 4 | 5 | 6 | 7 | 8 | 9 |
| (1) f1R/f1 | 0.529 | 0.660 | 0.703 | 0.645 | 0.552 | 0.618 | 0.896 | 0.544 | 0.453 |
| (2) L1/f1 | 0.659 | 1.101 | 1.206 | 0.801 | 0.788 | 0.757 | 1.467 | 0.569 | 0.611 |
| (3) f12/f1 | −1.057 | −1.812 | −2.872 | −1.417 | −1.036 | −1.583 | −4.472 | −1.076 | −0.725 |
| (4) f1/f2 | −2.364 | −2.935 | −1.623 | −2.453 | −1.518 | −2.226 | −1.750 | −3.310 | −2.668 |
| (5) β12/β1R | −0.178 | −0.371 | −0.355 | −0.054 | −0.169 | −0.313 | −0.141 | −0.107 | −0.070 |
| (6) (Rn1 − Rn2)/(Rn1 + Rn2) | 0.799 | 0.842 | 0.898 | 0.581 | 1.294 | 0.777 | −1.242 | 0.923 | 0.583 |

| | Numerical Example | | | | | | | | |
|---|---|---|---|---|---|---|---|---|---|
| | 1 | 2 | 3 | 4 | 5 | 6 | 7 | 8 | 9 |
| f1 | 112.679 | 78.295 | 83.194 | 104.315 | 103.516 | 106.721 | 67.068 | 144.048 | 133.924 |
| f2 | −47.656 | −26.579 | −51.258 | −42.519 | −68.205 | −47.934 | −38.331 | −43.520 | −49.815 |
| f1R | 59.632 | 51.655 | 58.487 | 67.278 | 57.183 | 65.902 | 60.091 | 78.329 | 60.698 |
| f12 | −119.073 | −141.870 | −238.909 | −147.825 | −107.270 | −158.917 | −299.941 | −155.065 | −97.096 |
| L1 | 74.204 | 86.224 | 100.341 | 83.565 | 81.539 | 80.838 | 98.377 | 82.009 | 81.883 |
| β12 | 0.234 | 0.487 | 0.752 | 0.041 | 0.218 | 0.315 | 0.659 | 0.113 | 0.105 |
| β1R | −1.316 | −1.313 | −2.119 | −0.764 | −1.293 | −1.007 | −4.658 | −1.055 | −1.510 |
| Rn1 | 1163.126 | 902.990 | 3110.287 | 1125.145 | −1088.974 | 1020.499 | −152.609 | 4168.195 | 332.074 |
| Rn2 | 130.288 | 77.552 | 166.565 | 298.167 | 139.714 | 128.034 | 1412.556 | 166.642 | 87.465 |

Image Pickup Apparatus

Figure 20:
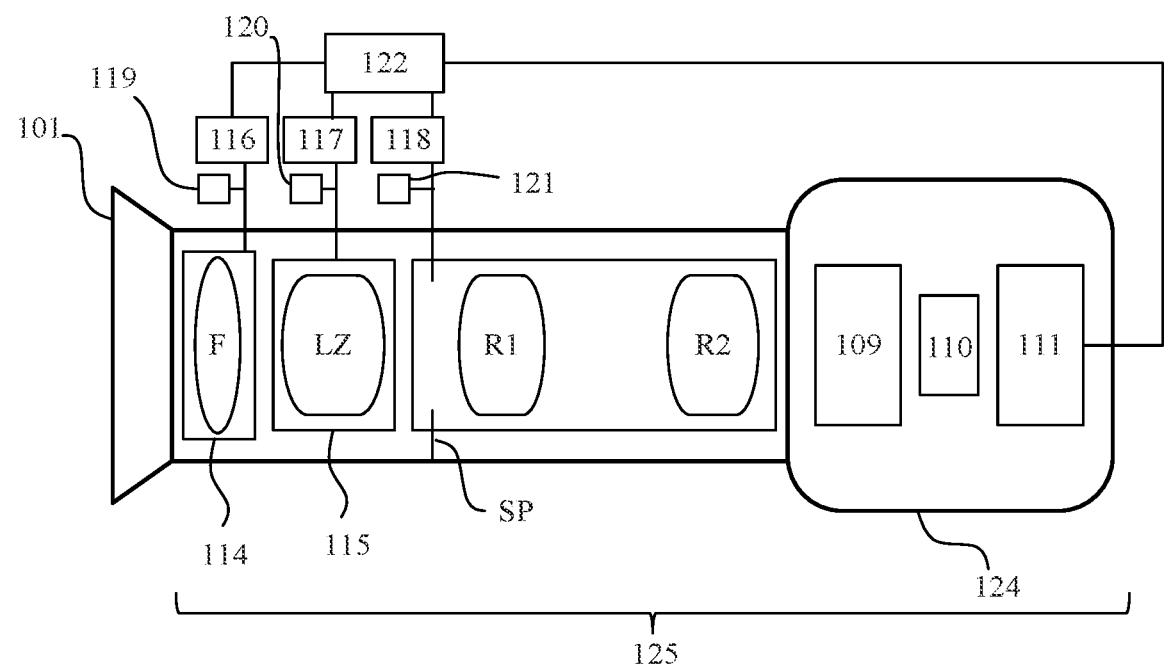
FIG. 20 is a schematic view of an image pickup apparatus.

FIG. 20 is a schematic view of an image pickup apparatus (television camera system) using the zoom lens according to each example for an imaging optical system.

In FIG. 20, reference numeral 101 denotes a zoom lens according to any one of Examples 1 to 9. Reference numeral 124 denotes a camera. The zoom lens 101 is attached to and detached from the camera 124. Reference numeral 125 denotes an image pickup apparatus that is made by attaching the zoom lens 101 to the camera 124. The zoom lens 101 includes a first lens unit F, a zooming lens unit LZ, and a rear unit R for imaging that includes and lens units R1 and R2. The first lens unit F includes a focus lens unit. The zooming lens unit LZ includes a second lens unit and a third lens unit that are moved on the optical axis during zooming, and a fourth lens unit that is moved on the optical axis to correct image plane fluctuations during zooming. SP denotes a diaphragm (aperture stop). Reference numerals 114 and 115 denote driving mechanisms such as a helicoid and a cam that drive the first lens unit F and the zooming lens unit LZ in the optical axis direction, respectively. Reference numerals 116 to 118 denote motors (driving units) configured to drive the driving mechanisms 114 and 115 and the diaphragm SP, respectively. Reference numerals 119 and 120 denote detectors such as an encoder, a potentiometer, or a photosensor for detecting the positions of the first lens unit F and the zooming lens unit LZ on the optical axis, respectively. Reference numeral 121 denotes a detector such as an encoder, a potentiometer, or a photo-sensor for detecting the aperture diameter of the diaphragm SP. In the camera 124, reference numeral 109 denotes a glass block corresponding to an optical filter and a color separation optical system in the camera 124, and reference numeral 110 denotes a solid-state image sensor (an image pickup element or a photoelectric conversion element) such as a CCD sensor and a CMOS sensor that captures an image formed by the zoom lens 101. Reference numerals 111 and 122 denotes CPUs that control various drives of the camera 124 and the zoom lens 101, respectively.

As described above, applying the zoom lens according to any one of examples to an image pickup apparatus such as a television camera, a movie camera, and a digital still camera can provide an image pickup apparatus having a high optical performance.

Each of the above examples can provide, for example, a zoom lens advantageous to a large aperture diameter, a small size, a light weight, and a high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-015921, filed on Feb. 3, 2021, which is hereby incorporated by reference herein in its entirety.

What is claimed is:

1. A zoom lens comprising, in order from an object side to an image side:
   a first lens unit having a positive refractive power;
   a plurality of zooming lens units configured to move along an optical axis in zooming and including a lens unit having a negative refractive power; and
   a final lens unit having a positive refractive power,
   wherein a distance between each pair of adjacent lens units changes in zooming,
   wherein the zoom lens comprises a diaphragm configured to move along the optical axis in zooming,
   wherein the first lens unit includes, in order from the object side to the image side, a first subunit having a negative refractive power, a second subunit having a negative refractive power, and at least one subsequent subunit, a distance between each pair of adjacent sub-units changing for focusing,
   wherein the second subunit is configured to move along the optical axis for focusing, and
   wherein the following inequality is satisfied:

$$0.20 < f1R/f1 < 1.10; \text{ and}$$

$$-0.60 < \beta12/\beta1R < 0.00$$

where f1R is a focal length of the at least one subsequent subunit in an in-focus state at infinity, f1 is a focal length of the first lens unit in the in-focus state at infinity, $\beta12$ is a lateral magnification of the second subunit in the in-focus state at infinity, and $\beta1R$ is a lateral magnification of the at least one subsequent subunit in the in-focus state at infinity.

2. The zoom lens according to claim 1, wherein the first lens unit is configured not to move in zooming.

3. The zoom lens according to claim 1, wherein the following inequality is satisfied:

$$0.20 < L1/f1 < 2.00$$

where L1 is a distance on the optical axis from a surface closest to the object side in the first lens unit to a surface closest to the image side in the first lens unit.

4. The zoom lens according to claim 1, wherein the following inequality is satisfied:

$$-4.80 < f12/f1 < -0.20$$

where f12 is a focal length of the second subunit in the in-focus state at infinity.

5. The zoom lens according to claim 1, wherein the plurality of zooming lens units include a second lens unit closest to the object side among the plurality of zooming lens units, and the following inequality is satisfied:

$$-6.50 < f1/f2 < -1.35$$

where f2 is a focal length of the second lens unit.

6. The zoom lens according to claim 1, wherein the following inequality is satisfied:

$$0 < (Rn1 - Rn2)/(Rn1 + Rn2) < 5.00$$

where Rn1 is a radius of curvature of a surface on the object side of a first lens disposed closest to the image side among at least one lens having a negative refractive power included in the first subunit, and Rn2 is a radius of curvature of a surface on the image side of the first lens.

7. The zoom lens according to claim 1, wherein the plurality of zooming lens units includes, in order from the object side to the image side, a second lens unit having a negative refractive power, and a third lens unit having a positive refractive power.

8. The zoom lens according to claim 1, wherein the plurality of zooming lens units includes, in order from the object side to the image side, a second lens unit having a negative refractive power, a third lens unit having a negative refractive power, and a fourth lens unit having a positive refractive power.

9. The zoom lens according to claim 1, wherein the plurality of zooming lens units includes, in order from the object side to the image side, a second lens unit having a negative refractive power, a third lens unit having a positive refractive power, and a fourth lens unit having a positive refractive power.

10. The zoom lens according to claim 1, wherein the plurality of zooming lens units includes, in order from the object side to the image side, a second lens unit having a negative refractive power, a third lens unit having a negative refractive power, a fourth lens unit having a negative refractive power, a fifth lens unit having a positive refractive power, and a sixth lens unit having a positive refractive power.

11. The zoom lens according to claim 1, wherein the at least one subsequent subunit includes a third subunit having a positive refractive power.

12. The zoom lens according to claim 11, wherein the third subunit is configured not to move for focusing.

13. The zoom lens according to claim 1, wherein the at least one subsequent subunit includes, in order from the object side to the image side, a third subunit having a positive refractive power, and a fourth subunit.

14. The zoom lens according to claim 13, wherein the third subunit is configured not to move for focusing, and the fourth subunit is configured to move for focusing.

15. An image pickup apparatus comprising:
    a zoom lens; and
    an image pickup element configured to pick up an image formed by the zoom lens,
    wherein the zoom lens includes, in order from an object side to an image side:
    a first lens unit having a positive refractive power;
    a plurality of zooming lens units configured to move along an optical axis in zooming and including a lens unit having a negative refractive power; and
    a final lens unit having a positive refractive power,
    wherein a distance between each pair of adjacent lens units changes in zooming,
    wherein the zoom lens comprises a diaphragm configured to move along the optical axis in zooming, wherein the first lens unit includes, in order from the object side to the image side, a first subunit having a negative refractive power, a second subunit having a negative refractive power, and at least one subsequent subunit, a distance between each pair of adjacent subunits changing for focusing, wherein the second subunit is configured to move along the optical axis for focusing, and wherein the following inequality is satisfied:

$$0.20 < f1R/f1 < 1.10; \text{ and}$$

$$-0.60 < \beta 12/\beta 1R < 0.00$$

where f1R is a focal length of the at least one subsequent subunit in an in-focus state at infinity, f1 is a focal length of the first lens unit in the in-focus state at infinity, $\beta 12$ is a lateral magnification of the second subunit in the in-focus state at infinity, and $\beta 1R$ is a lateral magnification of the at least one subsequent subunit in the in-focus state at infinity.

\* \* \* \* \*